United States Patent
Ishida et al.

(10) Patent No.: US 7,543,060 B2
(45) Date of Patent: Jun. 2, 2009

(54) SERVICE MANAGING APPARATUS FOR KEEPING SERVICE QUALITY BY AUTOMATICALLY ALLOCATING SERVERS OF LIGHT LOAD TO HEAVY TASK

(75) Inventors: Takeshi Ishida, Tokyo (JP); Jinghai Yin, Tokyo (JP); Minoru Yamamoto, Tokyo (JP)

(73) Assignee: Fujitsu Limited, Kawaski (JP)

( * ) Notice: Subject to any disclaimer, the term of this patent is extended or adjusted under 35 U.S.C. 154(b) by 633 days.

(21) Appl. No.: 09/897,100

(22) Filed: Jul. 3, 2001

(65) Prior Publication Data

US 2002/0116479 A1 Aug. 22, 2002

(30) Foreign Application Priority Data

Feb. 22, 2001 (JP) ............................. 2001-046516

(51) Int. Cl.
G06F 15/173 (2006.01)
(52) U.S. Cl. .................... 709/226; 709/223; 709/224
(58) Field of Classification Search ................ 709/220, 709/221, 223, 250
See application file for complete search history.

(56) References Cited

U.S. PATENT DOCUMENTS

| | | | | |
|---|---|---|---|---|
| 5,581,703 | A | * | 12/1996 | Baugher et al. ............. 709/225 |
| 5,951,694 | A | * | 9/1999 | Choquier et al. ............. 714/15 |
| 6,021,439 | A | * | 2/2000 | Turek et al. ................. 709/224 |
| 6,101,541 | A | * | 8/2000 | Ellesson et al. ............. 709/225 |
| 6,226,377 | B1 | * | 5/2001 | Donaghue, Jr. ........ 379/265.13 |
| 6,230,183 | B1 | | 5/2001 | Yocom et al. |

(Continued)

FOREIGN PATENT DOCUMENTS

EP 10588444 6/2000

(Continued)

OTHER PUBLICATIONS

Thissen, Dirk, and Neukirchen, Helmut, Managing Services in Distributed Systems by Integrating Trading and Load Balancing, 2000, IEEE, pp. 641-646.*

(Continued)

*Primary Examiner*—Eron J Sorrell
(74) *Attorney, Agent, or Firm*—Staas & Halsey LLP

(57) ABSTRACT

A plurality of service servers, which accept service requests from clients via a Web server connected to the Internet and render services, are connected to a service managing server distributing the service requests. The service servers are divided into groups for a plurality of levels depending on the quality of a rendered service. Furthermore, a service server that is called an intermediate server and can change the quality level of a rendered service is arranged in addition to the above described levels. If the load on a service server of a group on any of the levels increases, the service managing server uses the intermediate server as a server of that group, so that the load on the group is reduced. As a result, loads are made even among the groups, and the qualities are maintained.

13 Claims, 19 Drawing Sheets

HIGH -LEVEL

INTERMEDIATE GROUP

LOW-LEVEL

HEAVY LOAD

PROCESSING HIGH-LEVEL REQUEST BY RAISING LEVEL OF INTERMEDIATE GROUP SERVER, WHEN LOAD ON HIGH-LEVEL SERVER GROUP INCREASES AND QUALITY CANNOT BE MAINTAINED

INTERMEDIATE GROUP SERVER MAINTAINS QUALITY OF HIGH-LEVEL SERVICE AND EXECUTES LOW-LEVEL REQUEST IN NORMAL STATE

U.S. PATENT DOCUMENTS

| | | | |
|---|---|---|---|
| 6,463,454 B1 * | 10/2002 | Lumelsky et al. | 718/105 |
| 6,510,463 B1 * | 1/2003 | Farhat et al. | 709/224 |
| 6,516,350 B1 * | 2/2003 | Lumelsky et al. | 709/226 |
| 7,054,943 B1 * | 5/2006 | Goldszmidt et al. | 709/229 |
| 2002/0091854 A1 * | 7/2002 | Smith | 709/236 |

FOREIGN PATENT DOCUMENTS

| | | |
|---|---|---|
| JP | 9-212468 | 8/1997 |
| JP | 11-282695 | 10/1999 |
| JP | 2000-285085 | 10/2000 |

OTHER PUBLICATIONS

Cao et al., An architecture of Distributed Media Servers for Supporting Guaranteed QoS and Media Indexing, 1999, IEEE, pp. 1-5.*

Notice of Rejection Grounds for corresponding Japanese Application No. 2001-046516 mailed Oct. 31, 2006.

* cited by examiner

- INFORMATION OF EACH SERVICE SERVER (EXISTS FOR EACH SERVER)
  SERVER IDENTIFICATION ID: ID       LOAD VALUE OF SERVER : Load
  THRESHOLD VALUE : Limit_highLV , Limit_lowLV
  BELONGING GROUP : Group        LEVEL OF REQUEST TO BE PROCESSED : ReqLV
  QUALITY LEVEL TO BE MAINTAINED : ResLV
  LOAD VALUES OF SERVICES : serviceX , serviceY . . .
  EVALUATION VALUE OF SERVER PERFORMANCE : Power
- SHARED SYSTEM INFORMATION
  SERVER CONFIGURATION CHANGE TIME  : changeTime
  PRIORITIES OF SUMMED REQUESTS : Priority1 , Priority2 . . . .
  SERVER CONFIGURATION SCHEDULE  : schedule

SERVER INFORMATION STORING UNIT 33

- REQUEST LOG
  REQUEST TIME, SERVICE LEVEL, REQUESTED SERVICE . . . . .

LOG MANAGING UNIT 34

- INFORMATION OF LOCAL SERVER
  PROCESS BEING EXECUTED: runningService
  OTHER INFORMATION ARE SAME AS SERVICE SERVER INFORMATION WITHIN SERVER INFORMATION STORING UNIT

SERVICE SERVER LOAD MEASURING UNIT 35

36

F I G. 1 8

SERVICE MANAGING APPARATUS FOR KEEPING SERVICE QUALITY BY AUTOMATICALLY ALLOCATING SERVERS OF LIGHT LOAD TO HEAVY TASK

BACKGROUND OF THE INVENTION

1. Field of the Invention

The present invention relates to a service managing apparatus which distributes service requests to service servers providing services.

2. Description of the Related Art

These days, with the expansion of the Internet, a wide variety of business transactions are conducted on the Internet. Among others, an ASP (Application Service Provider) service that provides users with diversified application services via the Internet was put into practical use.

FIG. 1 shows the outline of the configuration of a system rendering an ASP service.

A plurality of service servers 10 rendering services, which are connected to a service managing server 11 managing the distribution of service requests to the plurality of service servers 10, accept service requests from clients 14. The service managing server 11, which is connected to a Web server 12, accepts service requests from the clients 14 via the Internet 15.

Such a system composed of the Web server 12, the service managing server 11, and the service servers 10 is called a data center 13, and collectively manages application services rendered from various providers.

In recent days, attempts have been made to implement an SLA (Service Level Agreement: an agreement for guaranteeing the quality of a service) that not only distributes accepted service requests to the service servers 10 to render services, but also provides the clients 14 with an application service while guaranteeing the quality of the rendered service under the agreement.

FIGS. 2A and 2B explain a conventional technique of a service managing method using the SLA for a service managing server.

Examples of service qualities guaranteed by the SLA include the response speed of a service server, a fault restoration time, compensation at a fault occurrence, etc. However, the following description is provided by assuming the response speed of a service server to be of a service quality.

As one of conventional methods implementing the SLA, there is a method dividing service servers into groups depending on qualities of rendered services as shown in FIG. 2A. In this case, the service servers are divided into groups such as a group of servers rendering high-quality services, a group of servers rendering general-level services, etc. The groups are respectively configured to render services while maintaining predetermined qualities of the services. The service managing server determines to which group service server a received service request is to be distributed according to the contents of the quality agreement of the service request, and transmits the service request.

In such a case, it is easy to maintain qualities in a unified manner in the respective groups. However, if requests concentrate on any of the levels, a load imbalance among servers increases, and, in consequence, all of the server resources cannot be effectively used. Namely, if a service quality is the response speed of a service server, the service server rendering a high-quality service must quickly respond to a service request from a client. Therefore, the service request must be distributed so as not to impose a heavy load on the high-quality service server. In this way, the high-quality service server can render a high-quality service in all cases, which facilitates the management of a service quality. As described above, however, the service servers are divided into groups depending on service quality levels. Therefore, service requests must be processed within a group even if they concentrate on any of the groups, leading to a load imbalance among the groups, that is, a waste of server resources.

Furthermore, as another conventional method implementing the SLA, there is a method with which all service servers process services of all quality levels as shown in FIG. 2B. In this case, each service server must preferentially process a service request under a high-quality agreement, and accept and process also a request under a general-level agreement at the same time. At this time, a service managing server does not need to learn the contents of the quality agreement of the request, and distributes each request to each service server so as to make the load on each service server even.

Accordingly, each service server must determine whether the request is either a request under a high-quality agreement or a general-level request, and process the request by changing the priority of the process according to a determination result. To implement this, a program composed of complex logic must be installed in the service server.

In such a case, the logic becomes complex and it is difficult to precisely maintain a quality, although all of the server resources can be evenly used and a load distribution can be made with ease. Additionally, if attempts are made to introduce such a method in an ASP service being operated, an individual application service must be drastically remade, which requires enormous amounts of time and cost.

FIG. 13 explains conventional problems.

If a service quality is attempted to be assured under the SLA as described above, the configuration shown in FIG. 2A cannot be adopted, and the configuration shown in FIG. 2A must be adopted. However, as described above, a load imbalance among groups arises, and server resources cannot be used effectively.

SUMMARY OF THE INVENTION

An object of the present invention is to provide a service managing apparatus that can suitably distribute server loads while maintaining service qualities.

A service managing apparatus according to the present invention, which accommodates a plurality of service servers each rendering a service via a network in response to a service request issued from a client and distributes the service request to the plurality of service servers, comprises: a managing unit managing the plurality of service servers by dividing the service servers into a plurality of groups of service servers depending on respective quality levels of rendered services, and an intermediate server group of service servers which make a shift among the plurality of groups, and render a service as a quality of the group to which the shift is made; and an intermediate server shifting unit reducing a load on a service server within any of the plurality of groups by using at least one service server with the lightest load within the intermediate server group as the service server within any of the plurality of groups, when the load on the service server within any of the plurality of groups increases, and a quality level to be rendered by any of the plurality of groups cannot be maintained.

According to the present invention, services can be rendered with stable qualities by dividing service servers into groups depending on the respective quality levels of the services. Additionally, a load imbalance among the groups, which is problematic, is resolved by arranging service servers within an intermediate server group, which can dynamically shift among the groups, and by shifting the service servers to a group on which a heavy load is imposed. As a result, a service of a stable quality can be rendered and the loads on service servers can be suitably distributed.

BRIEF DESCRIPTION OF THE DRAWINGS

FIG. 18 shows the data possessed by the respective units; and

DESCRIPTION OF THE PREFERRED EMBODIMENTS

Figure 4:
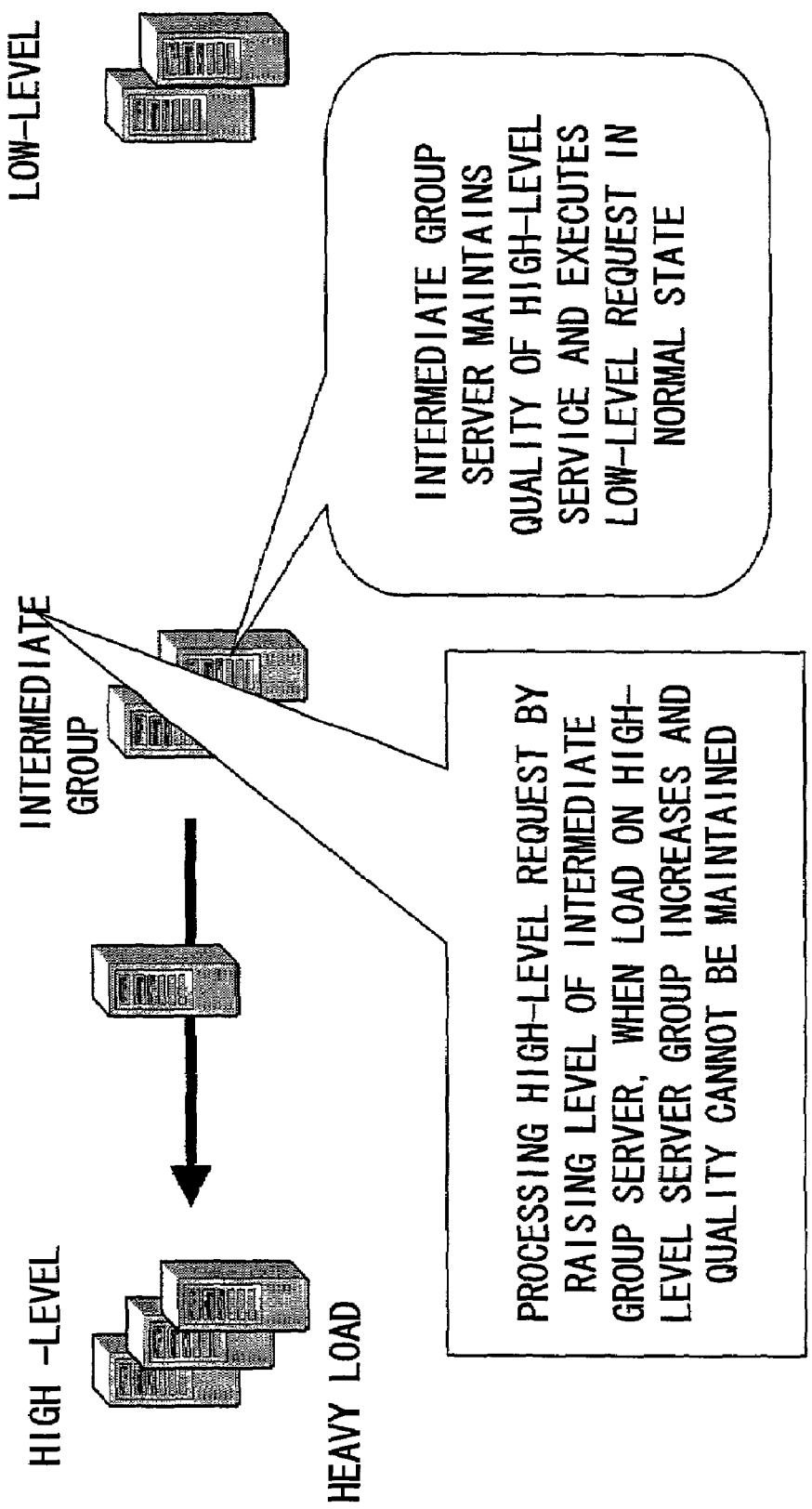
FIG. 4 shows the outline of a preferred embodiment according to the present invention.

FIG. 4 shows the outline of a preferred embodiment according to the present invention.

This preferred embodiment is explained by assuming that only a service agreement of high-level and low-level qualities is made with a client. In this case, high-level and low-level service server groups are prepared, and also service servers of an intermediate group are prepared according to this preferred embodiment. Service servers within the high-level group accept a request of a high-level quality exclusively. Service servers within the low-level group accept a request of a low level quality exclusively. The service servers within the intermediate group process a low-level request as a high-level quality. Namely, the low-level request is rendered as a high-level quality.

For example, if requests concentrate on the service servers of the high-level group and it becomes difficult to maintain the quality, the level of a service server of the intermediate group is raised, and the service server is made to process not a low-level but a high-level request.

In this case, the above described request distribution is collectively made by a service managing server.

Figure 5:
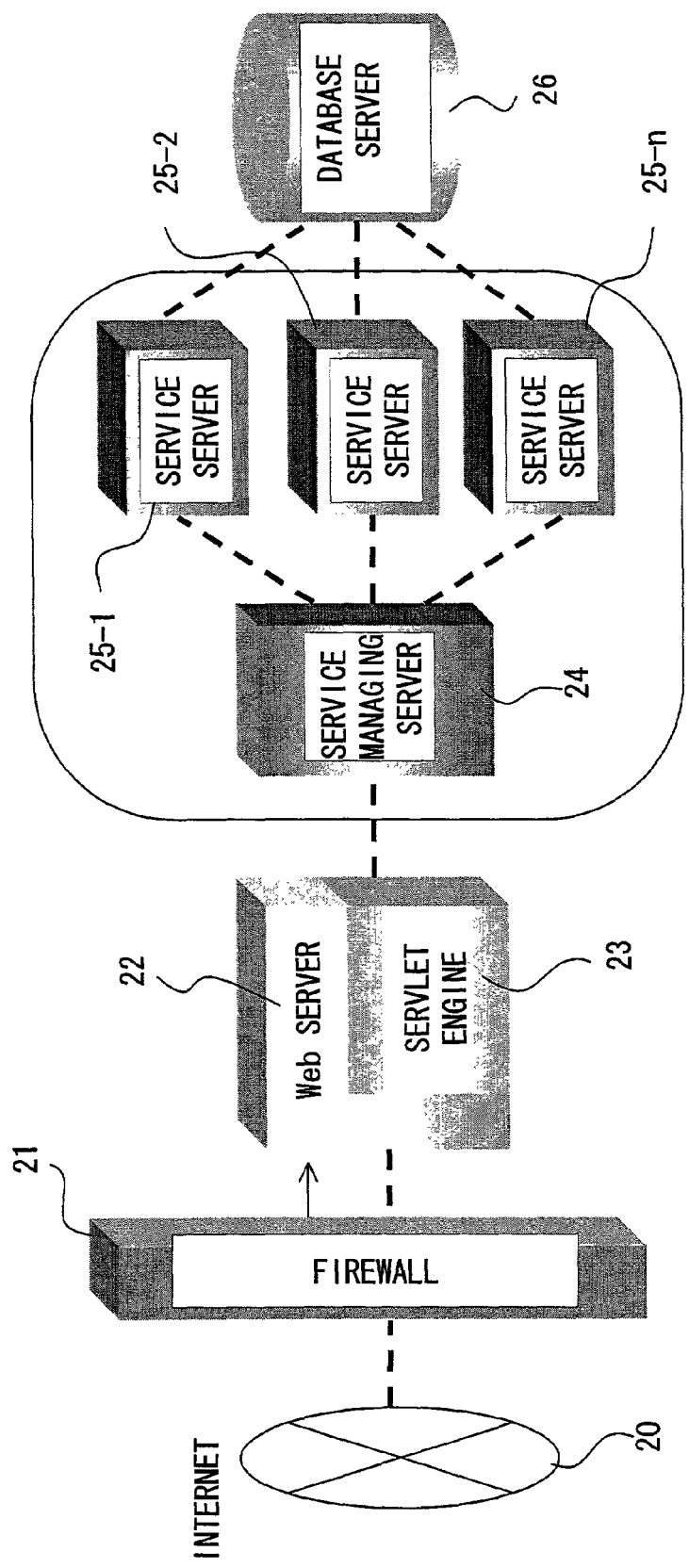
FIG. 5 shows the configuration of a system to which the preferred embodiment according to the present invention is applied.

FIG. 5 shows the configuration of a system to which the preferred embodiment of the present invention is applied.

A client (not shown) issues a request to a Web server 22 via the Internet 20. A data center composed of the Web server 22, a service managing server 24, service servers 25-1 to 25-n, and a database server 26 is protected by a firewall 21 against an externally made illegal access. A legal client possesses an account such as an ID for passing through the firewall 21, and notifies the Web server 22 of a request by using the account. In the Web server 22, a servlet engine 23, which is started up with this request as a trigger and issues an instruction to the service managing server 24 at a later stage, etc. is arranged. Accordingly, when the Web server 22 receives the request from the client, the servlet engine 23 issues an instruction to perform a process based on this request to the service managing server 24.

The service managing server 24 distributes the request to a suitable one of the service servers 25-1 to 25-n based on the instruction received from the servlet engine 23 within the Web server 22. In a normal state, a high-level request is passed to a service server of the high-level group, whereas a low-level request is passed to a service server of the intermediate group or the low-level group. The service servers 25-1 to 25-n obtain data required for rendering a service from the information stored in the database server 26, convert the obtained data into the contents of an application service, and return the converted contents to the client.

Figure 6:
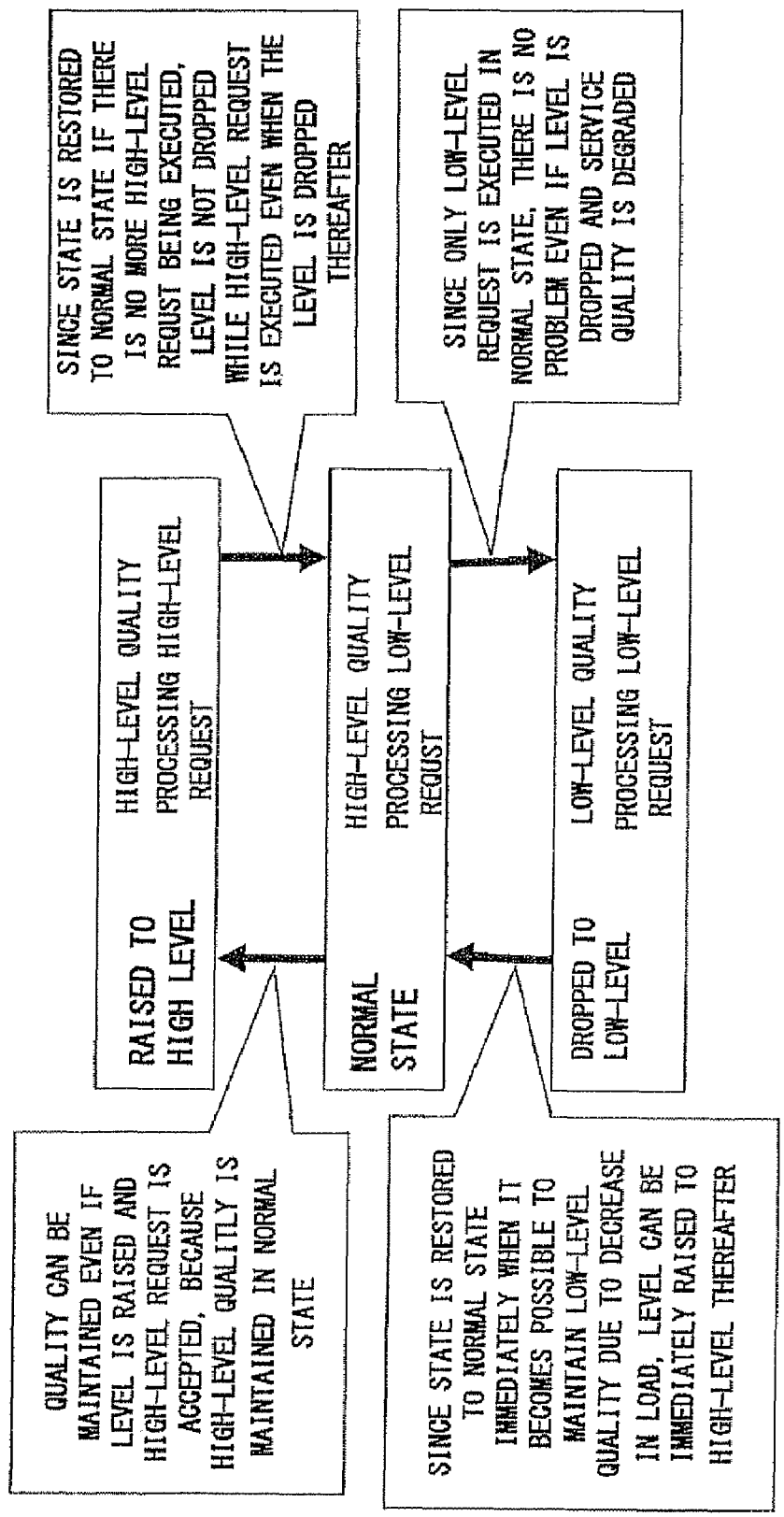
FIG. 6 shows the state shift of a service server (intermediate server) within an intermediate group.

Here, to make the service managing server perform the process explained with reference to FIG. 4, management data for managing service servers within the high-level, the low-level, and the intermediate groups are required. The following data is one example of the management data required in this preferred embodiment.

data managed by the service managing server
    service server information (defined for each service server)
ID=Server A : an ID for identifying a server
Load=20: the current load value of a service server (periodically notified from the service server to the service managing server)
Limit_HighLV=50, Limit_LowLV=100: threshold values (upper and lower limits of a load value for maintaining the quality of each service level)
Group=high-level: a group to which a server belongs
ReqLV=high-level: the level of a request to be executed
ResLV=high-level: the level of a quality to be maintained
serviceX=5, serviceY=10: load values of service processes (load values when a server execute the processes for respective services)
    shared information
changeTime=3:00 am: a time at which server configuration is automatically changed
Priority1=day of the week, Priority2=date: priorities of request summing (indicating which condition imbalance is preceded each time requests are summed up) schedule: schedule data of a server configuration
    information managed by each service server
      runningService={X, X, X, Y}: processes being executed
    service server information (the same as that managed by the service managing server)
    information that can be obtained from a client request Service=X: the type of a process to be executed
SL=high-level: the quality level of a service under an agreement FIG. 6 shows the state shift of a service server (intermediate server) within an intermediate group.

Figure 1:
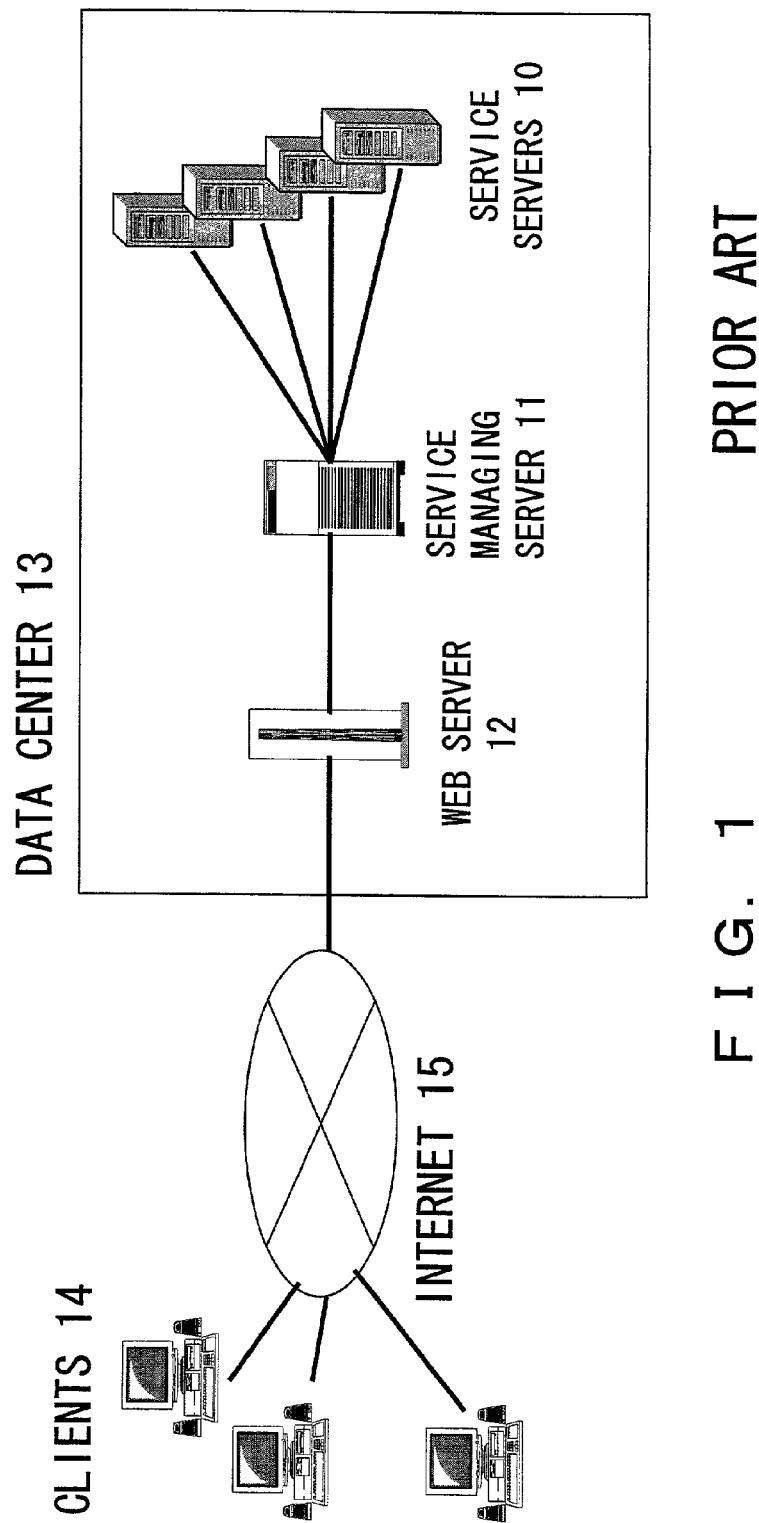
FIG. 1 shows the outline of the configuration of a system rendering an ASP service.
Figures 2A, 2B:
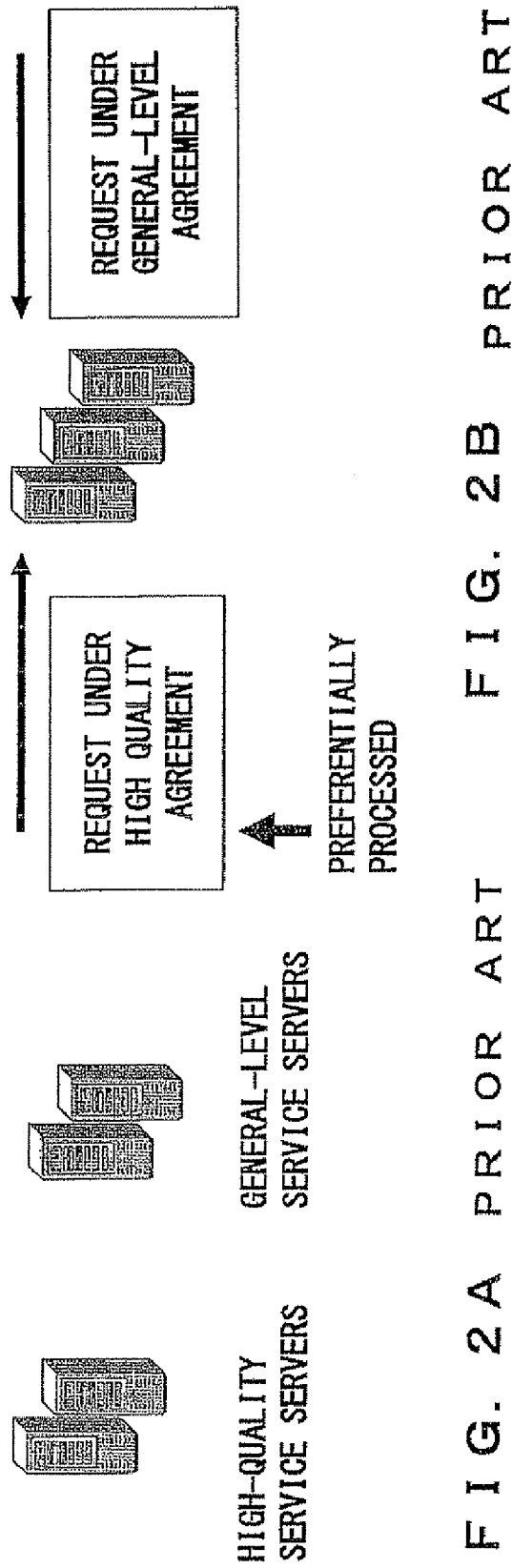
FIG. 2 explains a conventional technique of a service managing method using an SLA of a service managing server.
Figure 3:
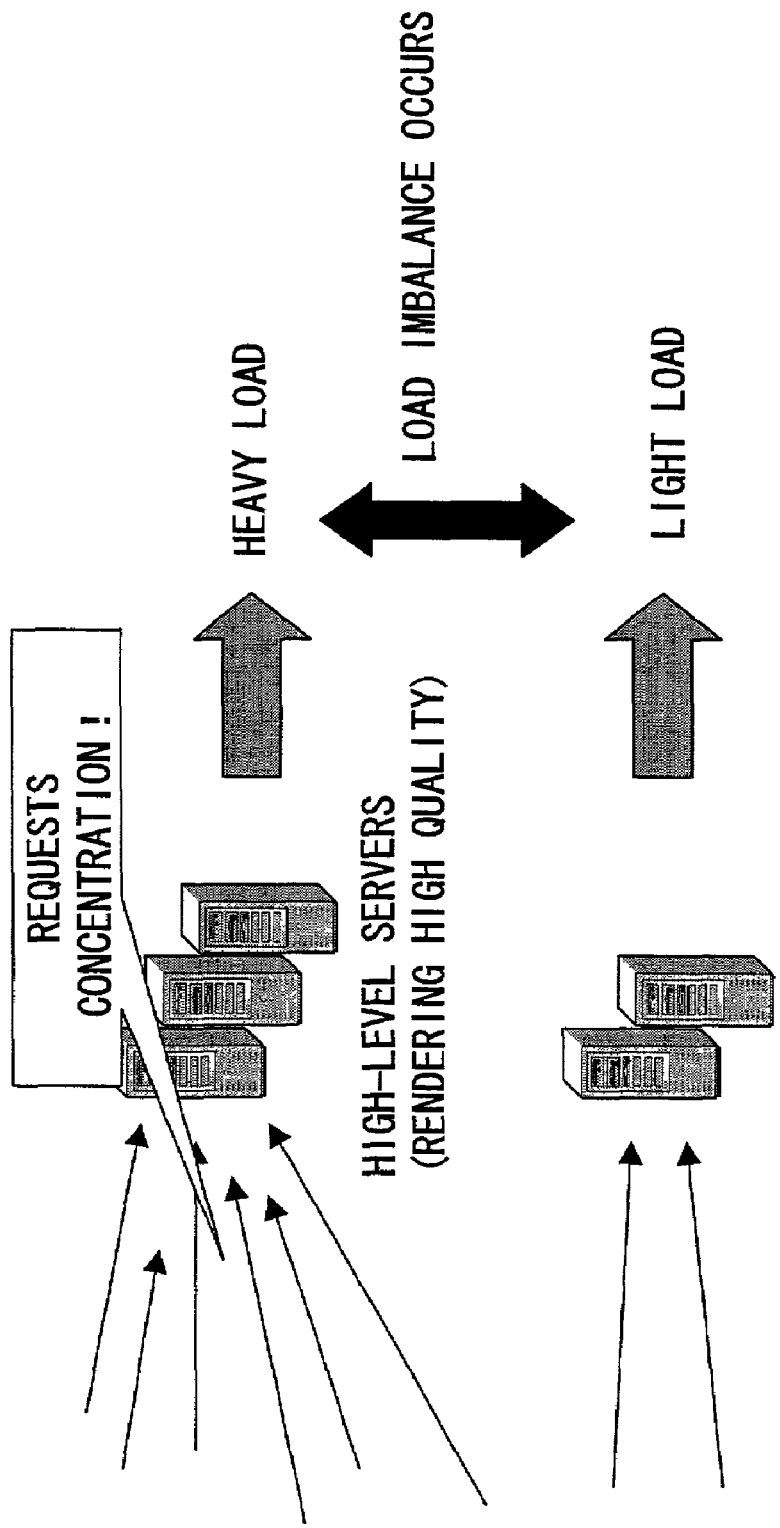
FIG. 3 explains conventional problems.

As shown in FIG. 2B, with a conventional load distribution method, a server with the lightest load is normally made to perform a process as a result of measuring the loads on servers and a network. However, with such a method that does not consider the quality of a service, compliance of an SLA and load distribution cannot be implemented simultaneously.

According to this preferred embodiment, both load distribution and quality maintenance can be implemented by precisely managing the quality to be maintained when the level of an intermediate server changes.

As shown in FIG. 6, an intermediate server processes a low-level request as a high-level quality in a normal state. Here, assume that the load on a service server of a high-level group increases, the level of the intermediate server is raised to the high-level, and the intermediate server processes a high-level request as a high-level quality. Since the high-level quality is maintained in the normal state in this case, the intermediate server can maintain the quality even if its level is raised and a high-level request is accepted.

Furthermore, the intermediate server can make a state shift from a high level to a normal level, from the normal level to a low level, or from the low level to the normal level, although the above provided description does not refer to this point.

Namely, if there is no more high-level request being executed while the level of the intermediate server is high, the state of the intermediate server is restored to the normal state. Accordingly, after the intermediate server has processed a high-level request while the level of the intermediate server is high, it begins to process a low-level request. As a result, the state of the intermediate server is restored to the normal state. Even if the level of the intermediate server drops due to an increase in the load on the low-level group, the state of the intermediate server makes a shift from the normal level to the low level. Therefore, the intermediate server does not begin to process a low-level request in the state where a high-level request is processed.

If the intermediate server shifts to the low level, it processes a low-level request as a low-level quality. Since the intermediate server executes only a low-level request in the normal state, no problem occurs even if the level of the intermediate server drops and its service quality is degraded. When the load on a service server within the low-level group decreases, and it becomes possible to render the quality of the high level, the intermediate server is restored to the normal state. Namely, a low-level request is to be processed as a high-level quality. After being restored to the normal state, the level of the intermediate server can be immediately raised to the high level as described above.

Figure 7:
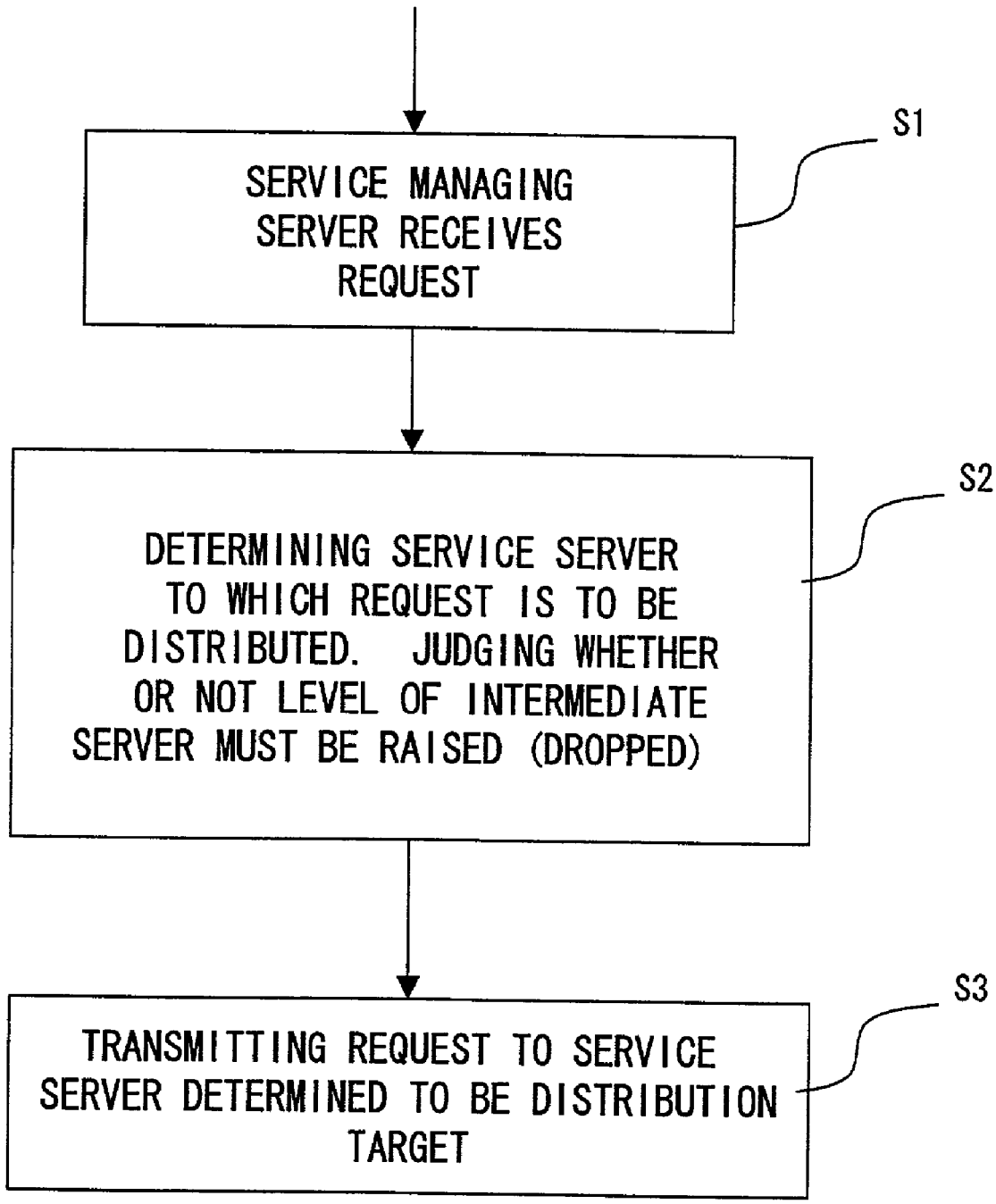
FIG. 7 shows the outline of processing performed by a service managing server.

FIG. 7 shows the outline of the processing performed by a service managing server.

First of all, in step S1, the service managing server receives a request. Next, in step S2, a service server to which a request is to be distributed is determined. Furthermore, it is judged whether or not the level of an intermediate server must be raised (dropped). Then, in step S3, the request is transmitted to the service server determined to be a distribution target.

The processes of steps S2 and S3 are described in detail below.

Figure 8:
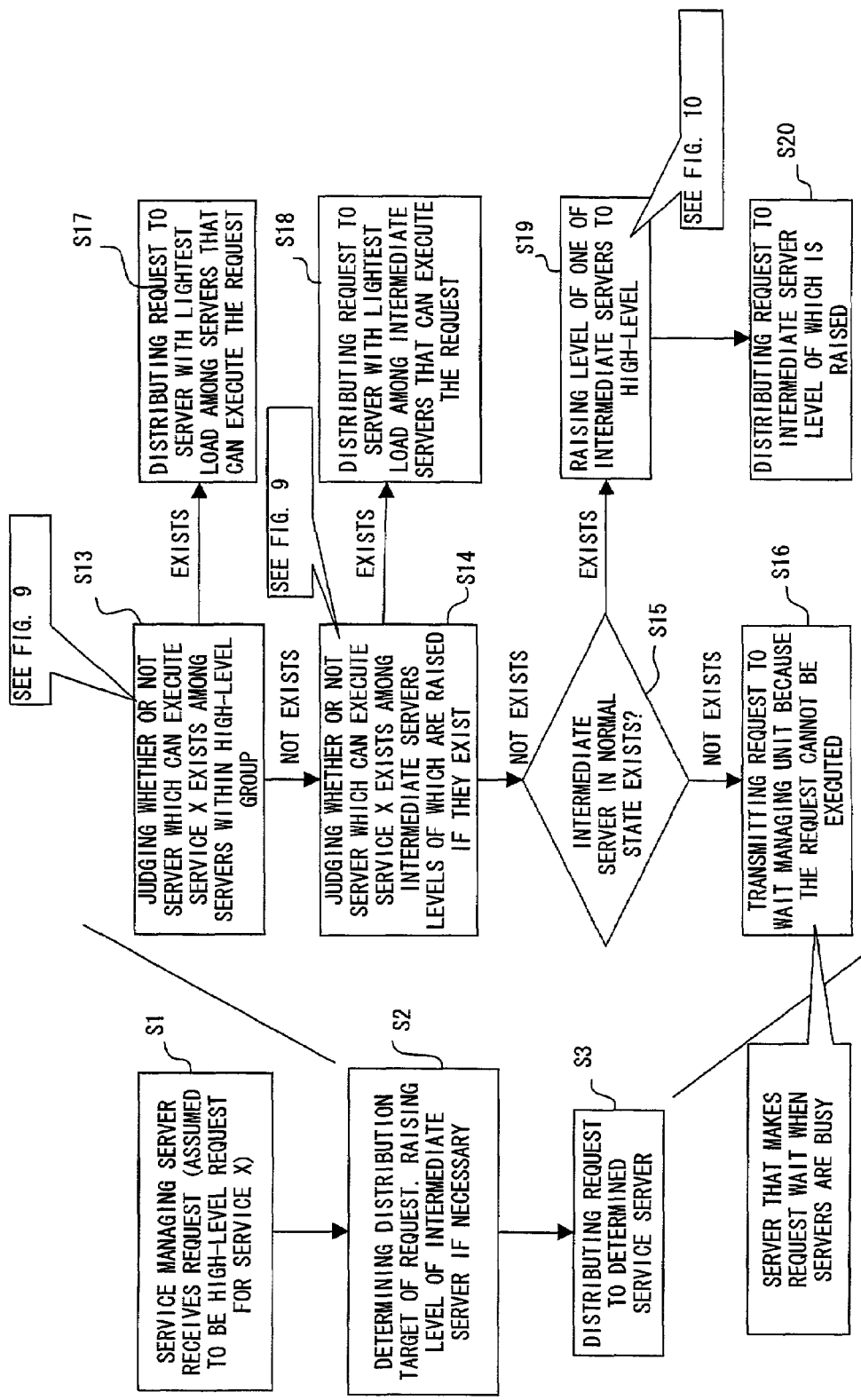
FIG. 8 is a flowchart showing the details of the processes performed by the service managing server.

FIG. 8 is a flowchart showing the details of the processes performed by the service managing server.

In this figure, the flow shown on the left side is the same as that shown in FIG. 7. Here, a received request is assumed to be a high-level request for a service X for ease of explanation.

In FIG. 8, shown on the right side are details of the flow of steps S2 and S3 on the left side.

First of all, upon receipt of a high-level request for the service X in step S1, the service managing server judges whether or not a service server that can execute the service X exists among servers of a high-level group in step S13. Details of step S13 will be described later with reference to FIG. 9. If it is judged that servers which can execute the service X exist in step S13, the process proceeds to step S17 where a request is distributed to a server on which the lightest load is imposed among the servers that can execute the service X.

If it is judged that no server which can execute the service X exists in step S13, it is further judged whether or not a server which can execute the service X exists among intermediate servers the levels of which are raised if they exist in step S14. Also details of step S14 will be described later with reference to FIG. 9.

If it is judged that an intermediate server which can execute the service X exists in step S14, the request is distributed to a server the load of which is the lightest among intermediate servers which can execute the service X.

If it is judged that no server which can execute the service X exists in step S14, the process proceeds to step S15 where it is judged whether or not an intermediate server in the normal state exists. If it is judged that intermediate servers in the normal state exist, the level of one of the intermediate servers is raised to a high-level in step S19. Details of step S19 will be described later with reference to FIG. 10. Then, in step S20, the request is distributed to the intermediate server the level of which is raised.

If it is judged that no intermediate server in the normal state exists in step S15, the request is transmitted to a wait managing unit in step S16. This is because the request cannot be executed. The wait managing unit is a server which makes a request wait when service servers are busy.

Figure 9:
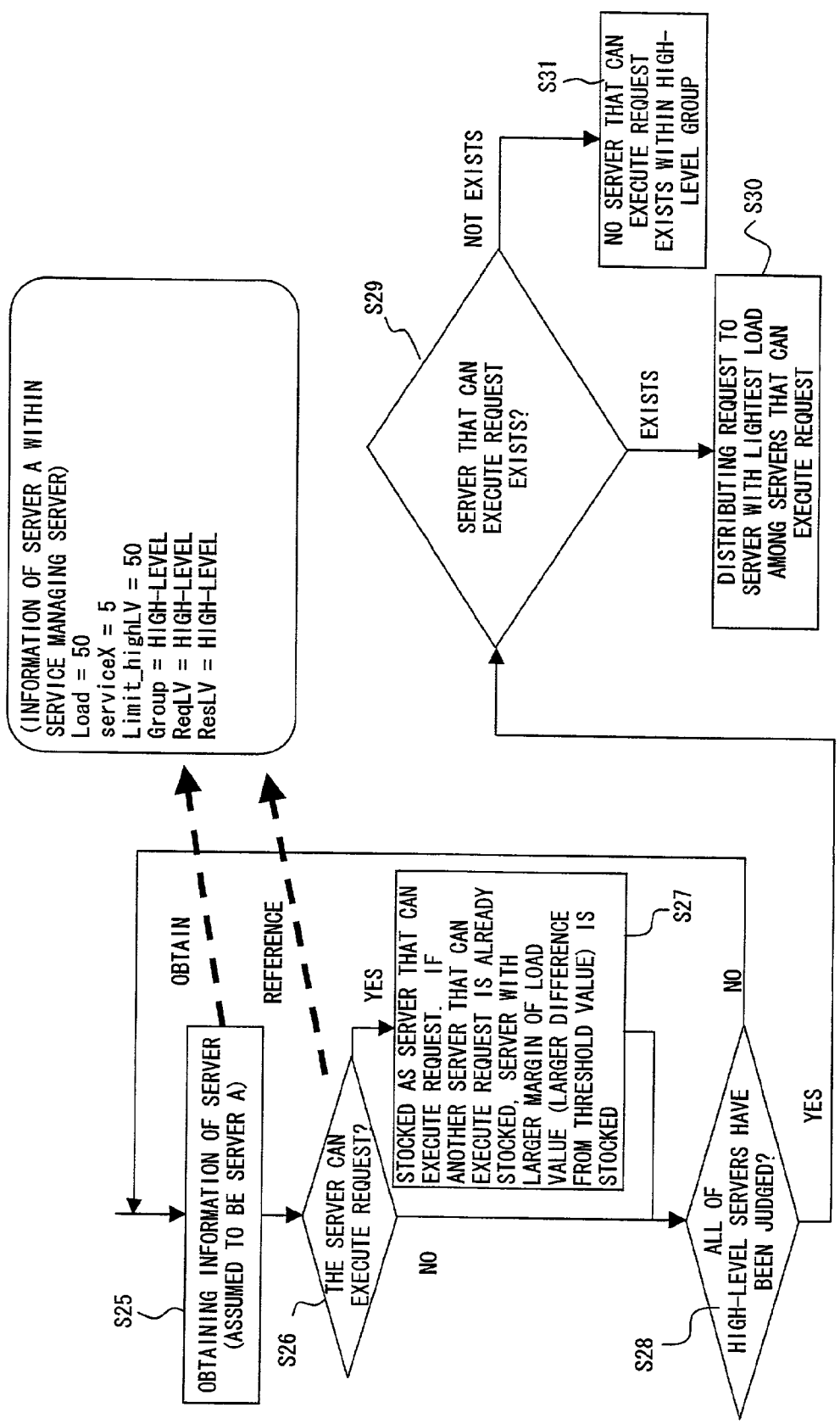
FIG. 9 is a flowchart showing the details of steps S13 and S14 shown in FIG. 8.

FIG. 9 is a flowchart showing the details of steps S13 and S14 shown in FIG. 8.

Note that FIG. 9 shows these steps as a process for a server within a high-level group. Also, a similar process is performed for an intermediate server the level of which is raised.

First of all, information of a server to be examined (assumed to be a server A in this case) is obtained in step S25. The server information obtained in this step is exemplified in the upper right portion of FIG. 9. Then, it is judged whether or not the server can execute a request in step S26. In this case, it is judged that the server cannot execute the request according to the server information in the upper right portion of FIG. 9. The reason is that the server cannot maintain a high-level quality if it accepts the request. Namely, a load limit required for maintaining the high-level quality is 50, but the current load is 50 and increases by 5 if the server executes the request. Accordingly, the process proceeds to step S28 if it is judged that the server cannot execute the request. If it is judged that the server can execute the request, its information is stocked (stored) as a server that can execute the request in step S27. If another server that can execute the request is already stored, a server with a larger margin of its load (with a larger difference from a threshold value) is stored. The process then proceeds to step S28.

In step S28, it is judged whether or not all of servers within a high-level group have been examined. If "NO", the process goes back to step S25. If "YES", the process proceeds to step S29 where it is judged whether or not a server which can execute the request exists. If it is judged that servers which can execute the request exist, the request is distributed to a server the load of which is the lightest among the servers which can execute the request in step S30. If no server which can execute the request exists, it is judged that no server which can execute the request exists within the high-level group in step S31.

Figure 10:
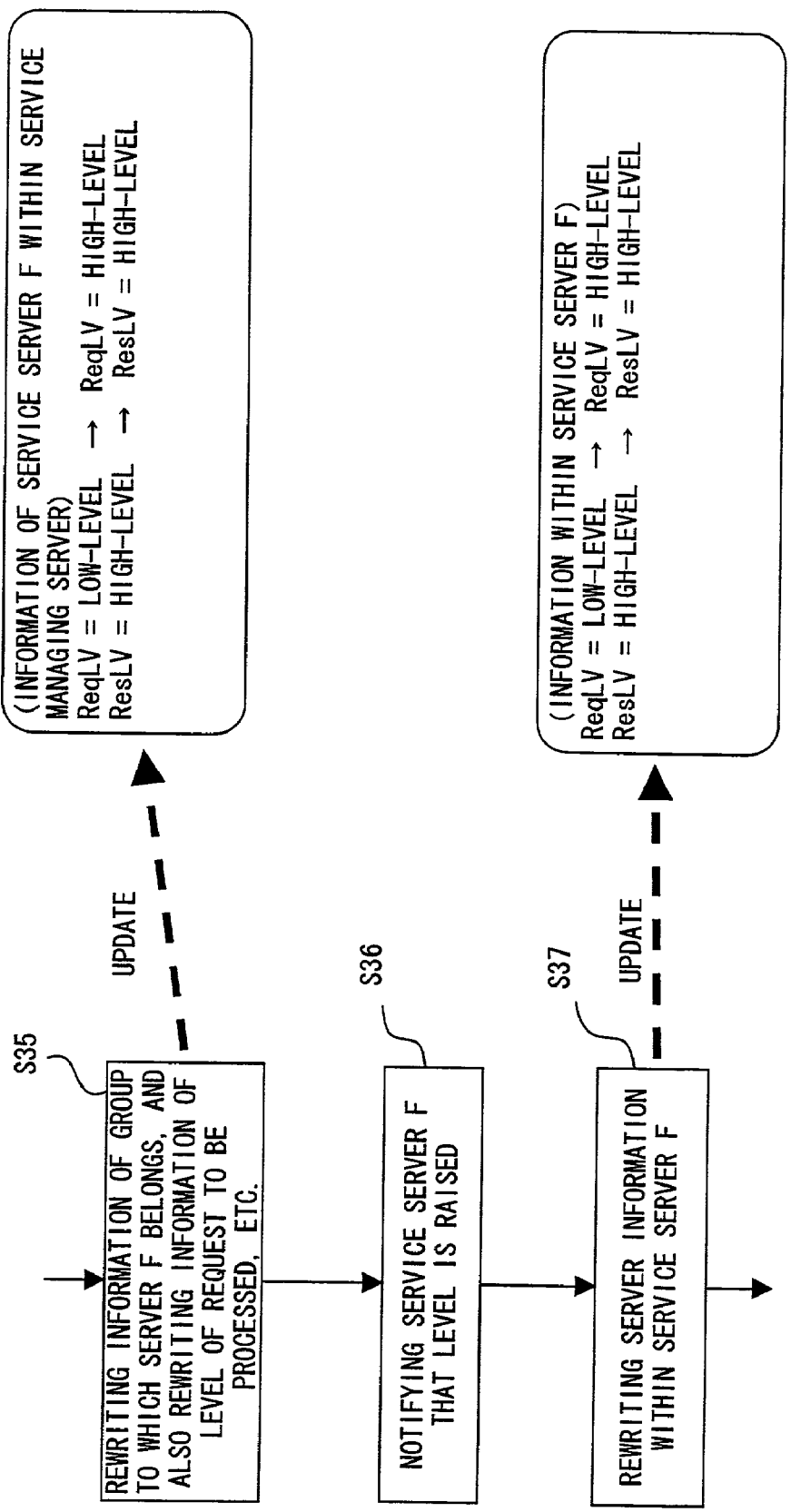
FIG. 10 is a flowchart showing the details of step S19 shown in FIG. 8.

FIG. 10 is a flowchart showing the details of step S19 shown in FIG. 8.

Here, it is assumed that the level of an intermediate server F is raised.

First of all, in step S35, information of a group to which the server F belongs within service server information of a service managing server is rewritten, and also information of the level of a request to be executed, etc. is rewritten. In the example shown in the upper right portion of FIG. 10, a level ReqLV of a request to be executed is rewritten from low-level to high-level, and a quality to be maintained remains unchanged as the high-level. Next, in step S36, the service managing server notifies the service server F (intermediate server) that the level of the server F is raised. Then, in step S37, the service server F rewrites the server information that the service server F itself possesses. Namely, the service server F rewrites ReqLV from the low-level to the high-level as shown in the lower right portion of FIG. 10.

Next, a preferred embodiment automatically measuring the load on each service server is explained.

To maintain the quality of a service rendered by each service server, the weight (load value) of each executed service must be properly grasped. However, the load of execution of a service depends on the ability or the state of a service server that executes the service. Therefore, if the load is defined with a static method, its accuracy becomes poor. However, if the load is manually measured each time a new service is installed, there is a possibility that not only a load is imposed on an administrator, but also the operations are interrupted. Therefore, a load imposed when a service is executed is automatically measured while operating the service.

By measuring the load imposed when a service is executed while operating the service as described above, the following advantages can be obtained.

A service load is measured and modified in real time even if a change occurs in an environment, so that accurate information can be obtained in all cases. As a result, a request can be accurately distributed and an SLA is easy to be complied.

It is unnecessary to suspend a service in order to measure a load even if a new service is installed.

Figure 11:
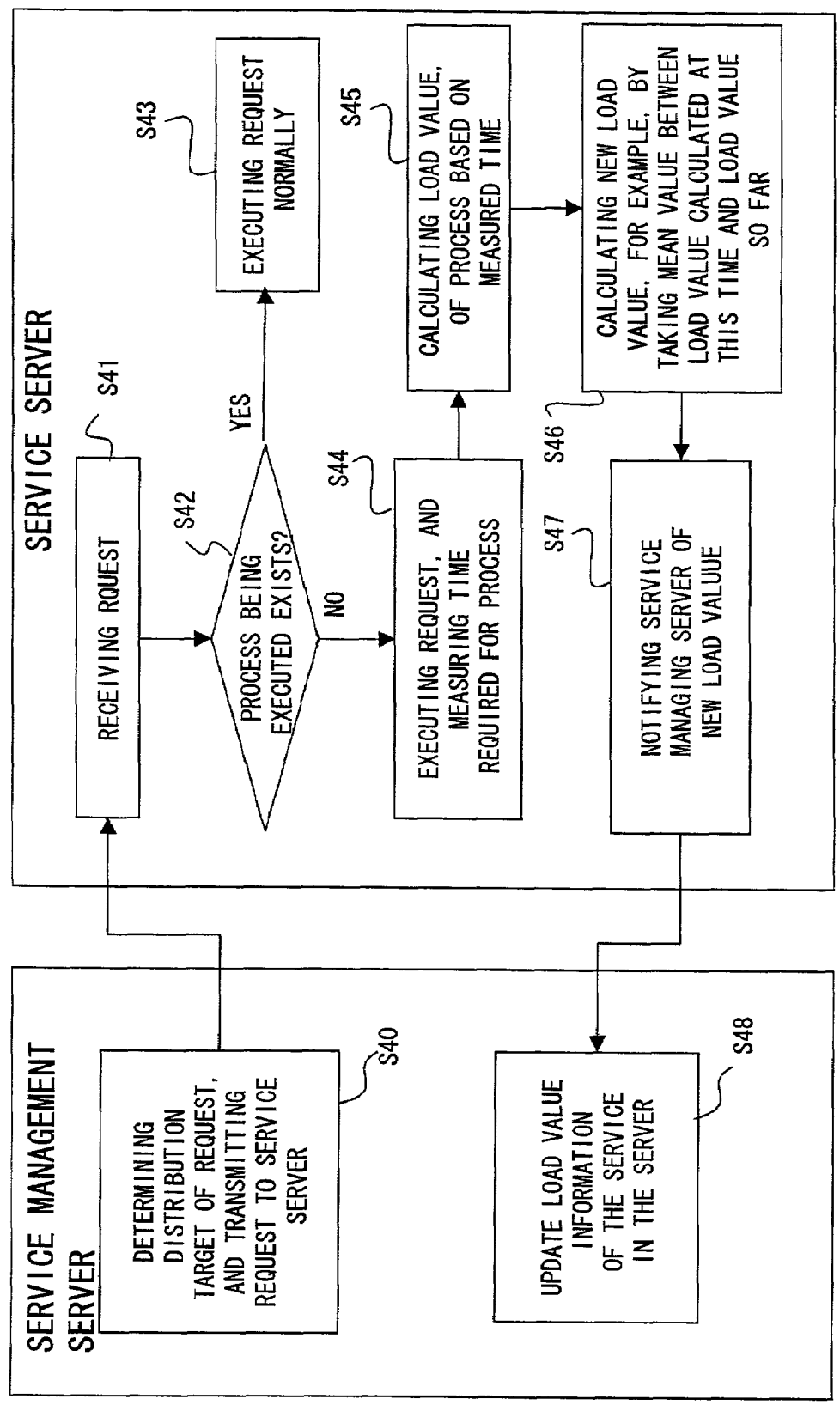
FIG. 11 shows the flow of the process for automatically measuring a service load.

FIG. 11 shows the flow of the process for automatically measuring a service load.

First of all, in step S40, a service managing server determines a distribution target of a request, and transmits the request to the target service server. The service server receives the request in step S41, and judges whether or not a process being executed exists in step S42. If the process being executed exists, the process proceeds to step S43 where the request is executed in a normal manner. If it is judged that the process being executed does not exist in step S42, the process proceeds to step S44 where the request is executed, and the time required for executing the request is measured. Then, in step S45, the load value of the request execution is calculated based on the measured time. The process then proceeds to step S46. In step S46, a new load value is calculated, for example, by taking a mean value between the load value calculated at this time and the load value so far. Then, in step S47, the new load value is notified to the service managing server. The service managing server updates the load information of the service of the corresponding server in step S48.

Figure 12:
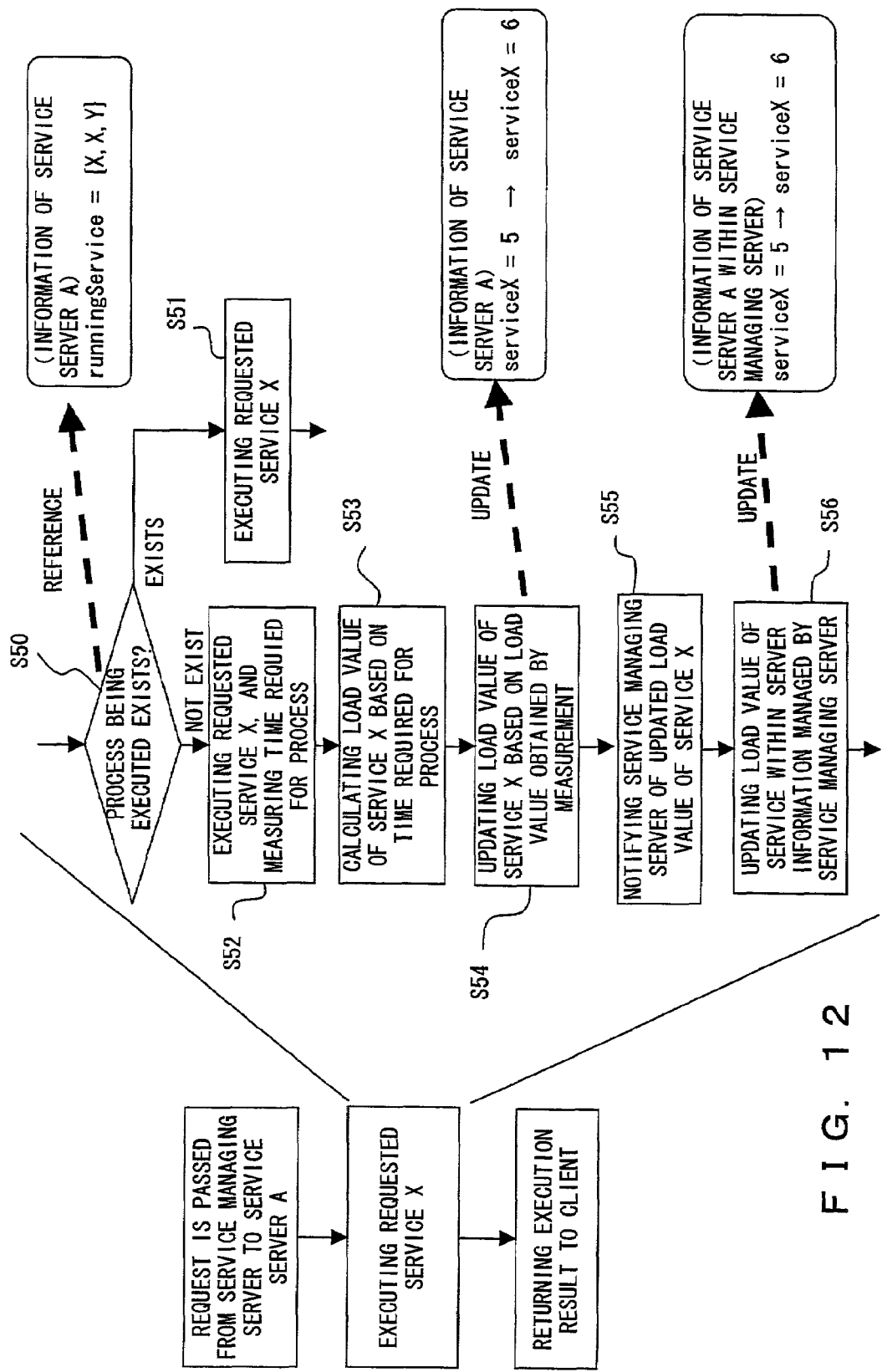
FIG. 12 is a flowchart specifically showing the process for automatically measuring a service load.

FIG. 12 is a flowchart specifically showing the process for automatically measuring a service load. The outlined flow shown on the left side of FIG. 12 is composed of processes where a request is first passed from a service managing server to a service server A, which executes a requested service X, and an execution result is returned to a client via the service managing server.

In these processes, load measurement is made in the step executing the requested service X. The flow on the right side of FIG. 12 shows the details of the load measurement.

First of all, in step S50, the service server judges whether or not a process being executed exists. Here, the service server references runningService={X, X, Y} within information of its own (information of a service server A). Since the service being executed exists in this case, the process proceeds to step S51 where the requested service X is executed. If the service being executed does not exist in step S50, the process proceeds to step S52 where the requested service X is executed, and the time required for executing the service X is measured. Then, in step S53, the load value of the service X is calculated based on the time required for the execution. The time required for the execution or a time that a CPU, etc. occupies when a service is executed may be available as the load value.

Then, in step S54, the load value of the service X is updated based on the load value obtained by the measurement. In step S55, the updated load value of the service X is notified to the service managing server, which updates the service load value within the server information that the service managing server itself manages.

Here, the states of the updates made in steps S54 and S56 are shown at the right end of FIG. 12. Namely, the load value of the service X "serviceX=5" within the service information that the service server A locally possesses is updated to "serviceX=6" (in this case, a load value "6" is assumed to be obtained as a result of the load value measurement), and also the load value "serviceX=5" within the information of the service server A that the service managing server possesses is updated to "serviceX=6".

If the number of service servers within each group is fixed in the above described preferred embodiment, an imbalance of requests that cannot be executed only by intermediate servers can possibly occur. Accordingly, this imbalance must be resolved. To be more specific, a request imbalance depending on a day of the week or a date is found by analyzing a request log, the operation schedule of service servers is set based on the imbalance, and the servers are automatically divided into groups.

Figure 13:
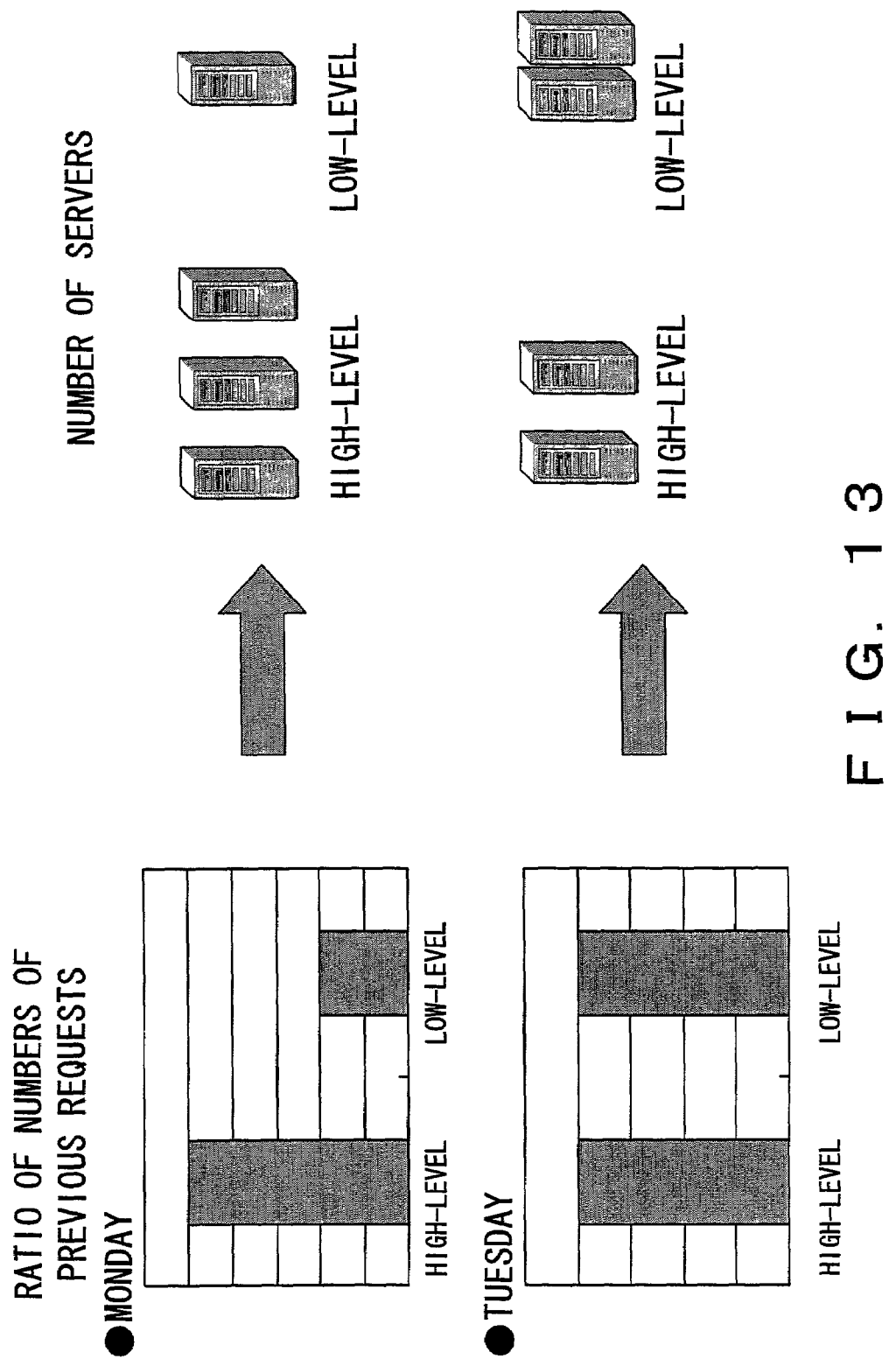
FIG. 13 shows the concept of a preferred embodiment setting a service server operation schedule.

FIG. 13 shows the concept of a preferred embodiment setting the operation schedule of service servers.

Here, intermediate servers are handled arbitrarily. However, the following description is provided by assuming that the number of intermediate servers is fixed, and only high-level and low-level servers are changed.

Suppose that the ratio of the number of high-level requests is judged to be large on Monday, and the ratio of high-level to low level requests is judged to be nearly 1:1 on Tuesday according to the numbers of previous requests. In this case, the numbers of high-level and low-level service servers are respectively increased and decreased on Monday. Additionally, the numbers of high-level and low-level servers are made nearly equal on Tuesday. However, also the existence of intermediate servers must be considered when the numbers of high-level and low-level servers are determined. Accordingly, even if the numbers of high-level and low-level requests are the same on Tuesday, the numbers of high-level and low-level servers are not necessarily be set to the same value.

In the above described preferred embodiment, service servers are divided into groups only with a static method, and an administrator must manually adjust the grouping. As a result, there is a possibility that a request imbalance directly causes a load imbalance, which leads to degradation of performance. However, according to the above described preferred embodiment, a server configuration schedule is generated based on the numbers of previous requests, thereby coping with a request imbalance depending on a day of the week or a date. Additionally, service servers the number of which is optimized according to the number of requests are arranged for each group, whereby the number of times that the level of an intermediate server is raised or dropped decreases, leading to a reduction in the load on a service managing server. Furthermore, since a service server configuration is automatically changed according to a schedule, not only reduction in a load on an administrator and the number of man-induced errors, but also shortening of the time required for changing a server configuration can be implemented.

Figure 14:
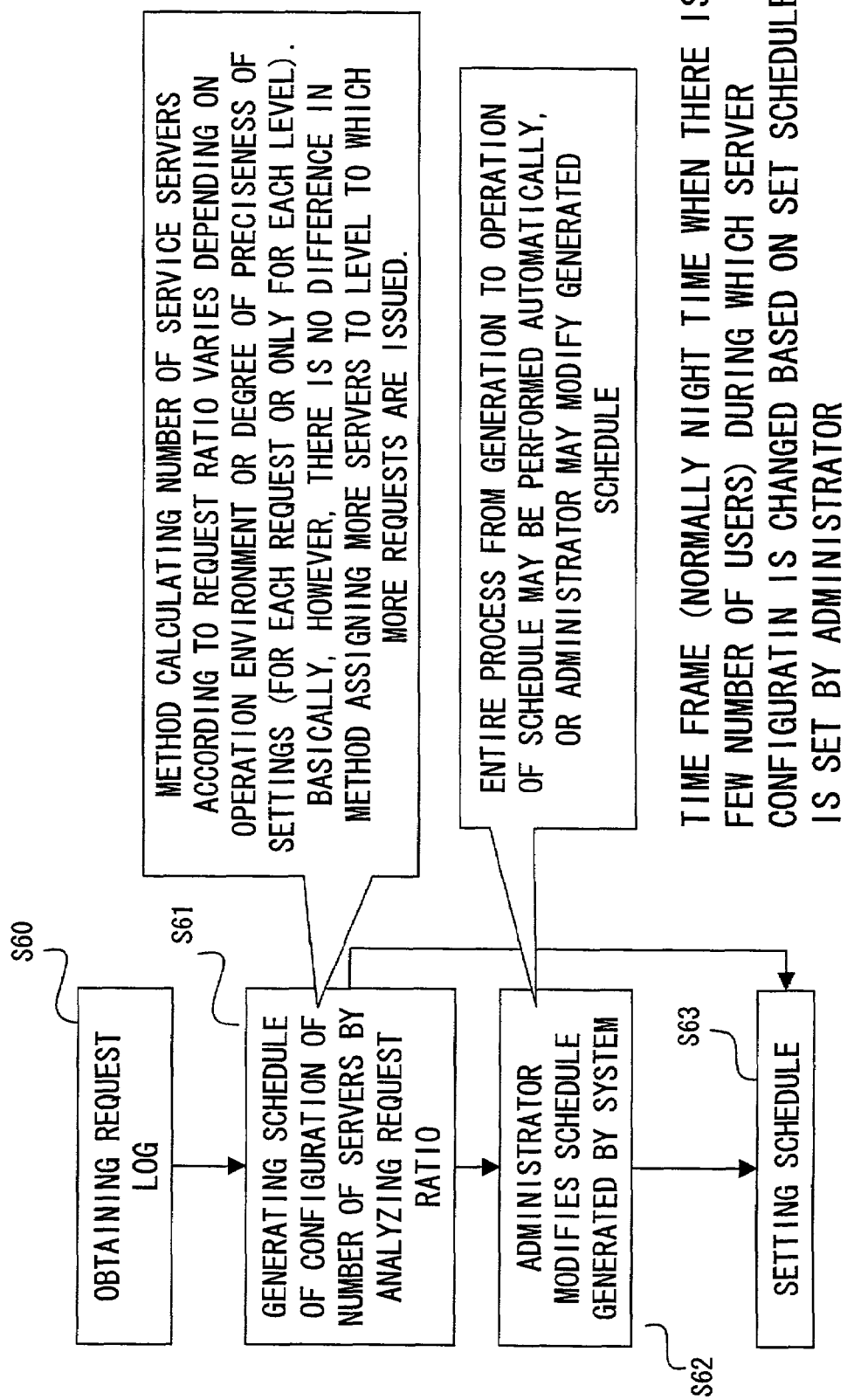
FIG. 14 shows the flow of the outline of a schedule setting process.

FIG. 14 shows the outline of the flow of a schedule setting process.

First of all, in step S60, a request log is obtained. Next, in step S61, a request ratio is analyzed, and a schedule of the configuration of the numbers of service servers is made. Here, a method calculating the number of service servers according to the request ratio varies depending on the operation environment or the degree of preciseness of settings (for each request or only for each level). Basically, more servers are assigned to a level to which more requests are issued. For the details, a person having ordinary skill in the art applying the present invention must suitably determine the numbers of a service server configuration.

In step S62, an administrator modifies the schedule generated by the system, and the schedule is set in step S63. The process for modifying a schedule, which is performed by the administrator, is arbitrary. Namely, the entire process from the generation to the operation of a schedule may be performed automatically, or the administrator may modify a generated schedule.

Figure 15:
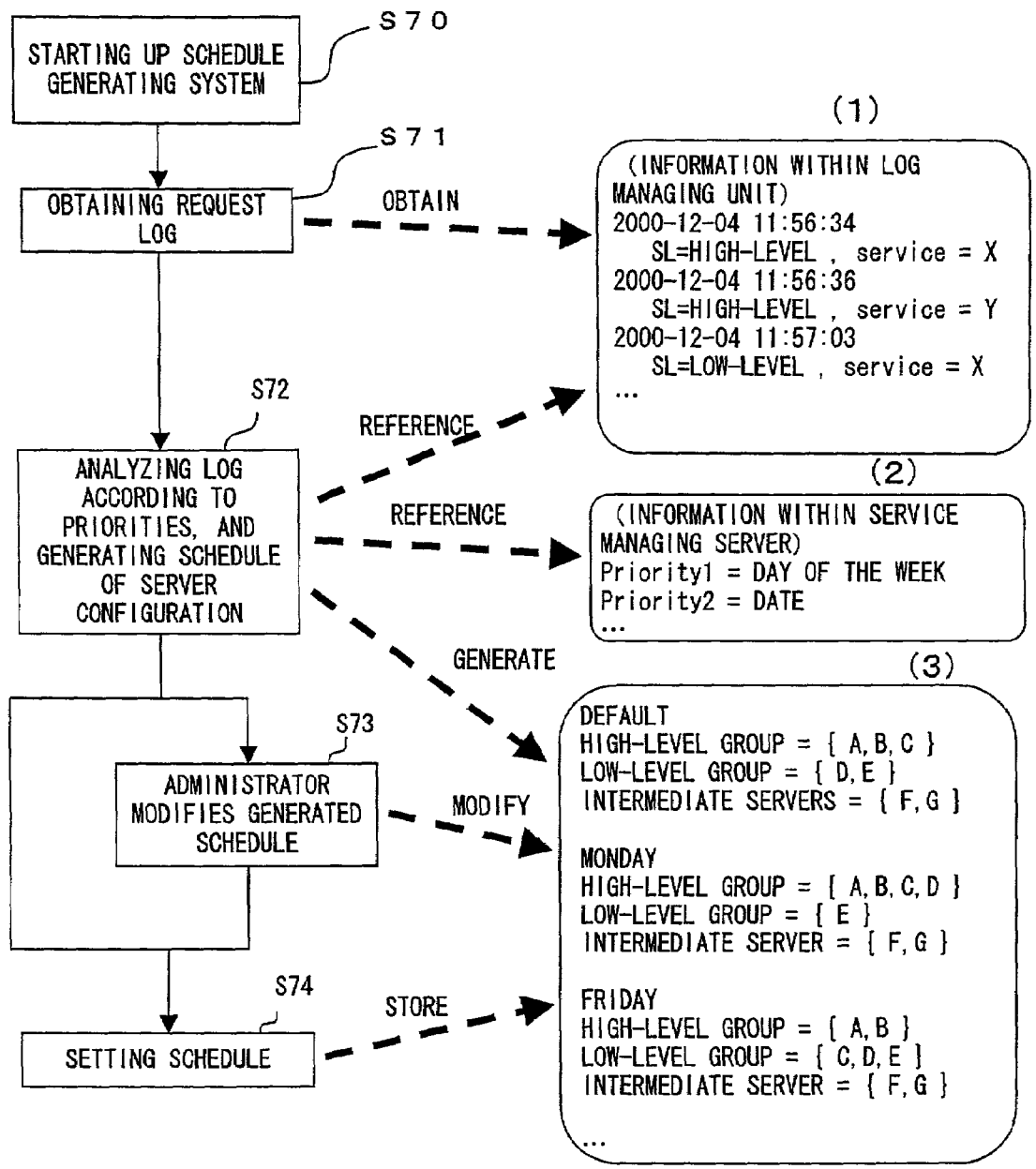
FIG. 15 is a more specific flowchart showing the schedule setting process.

FIG. 15 is a more specific flowchart showing the schedule setting process.

First of all, in step S70, a schedule generating system is started up. Then, in step S71, a request log, which is a request process progress state recorded by a log managing unit within a service managing server, is obtained in step S71. The request log is a record shown in (1) on the right side of FIG. 15. Then, in step S72, the request log is analyzed according to priorities, and a server configuration schedule is generated. That is, the schedule shown in (3) on the right side of FIG. 15 is generated by referencing the information of the log managing unit and the information of the service managing server, which are respectively shown in (1) and (2) on the right side of FIG. 15. If necessary, the process proceeds to step S73 where the administrator modifies the generated schedule. Then, the schedule is set in step S74. Namely, the schedule shown in (3) on the right side of FIG. 15 is stored in the service managing server.

Figure 16:
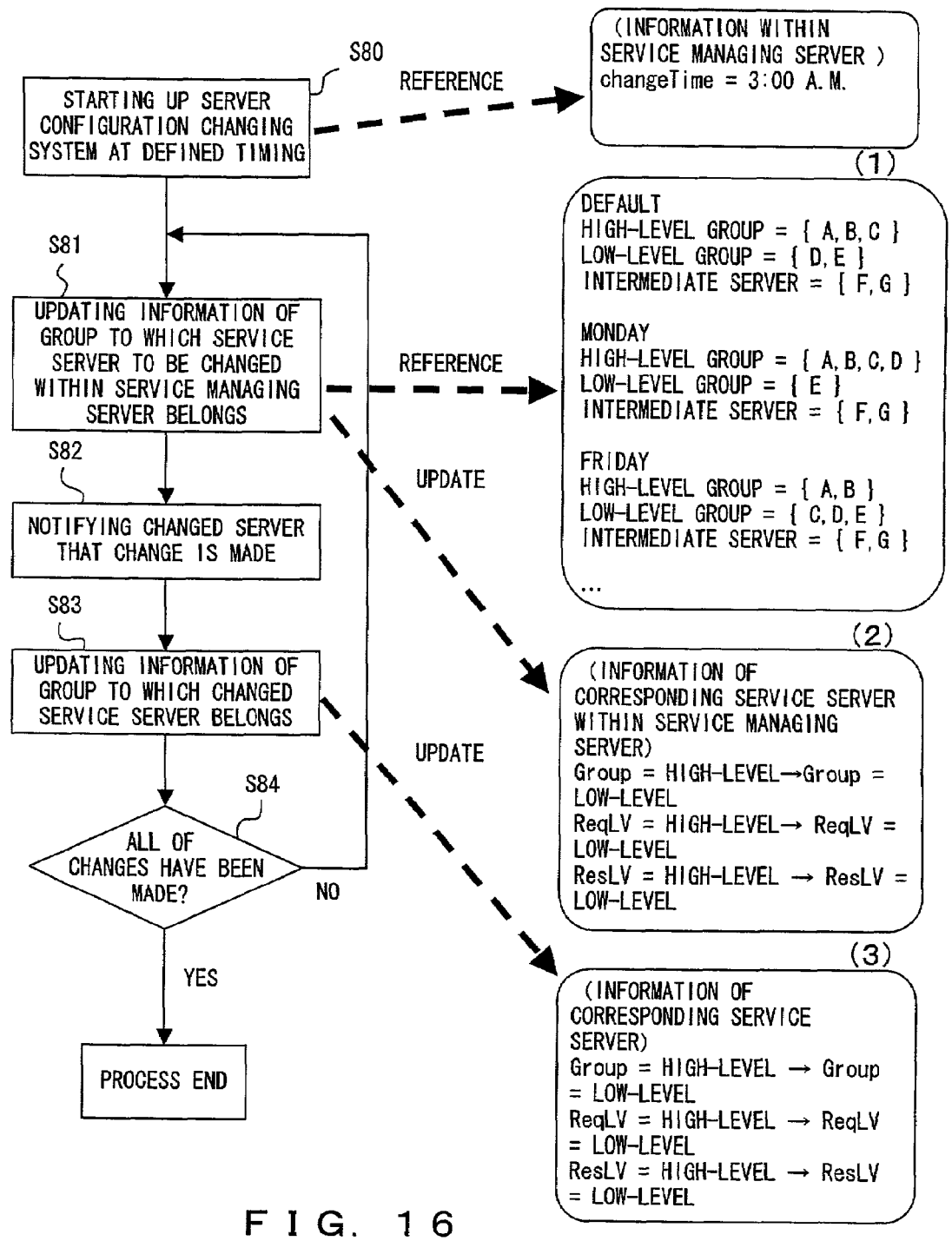
FIG. 16 is a flowchart showing the process performed when a service server configuration is changed based on a schedule.

FIG. 16 is a flowchart showing the process performed when a service server configuration is changed based on a schedule.

First of all, in step S80, a service server configuration changing system is started up at defined timing. At this time, information of a service managing server, such as change Time=3:00 am, etc., are referenced. The information that the service server configuration is changed at 3:00 am is defined in this case. Next, in step S81, information of a group, to which a service server to be changed belongs, within the service managing server is updated in step S81. Namely, the information in (1) on the right side of FIG. 16 is referenced, and the information of the corresponding service server within the service managing server in (2) shown on the right side of FIG. 16 is updated. Then, in step S82, a change notification is transmitted to the service server to which the change is made. In step S83, the service server that receives the change notification changes the information of its belonging group within the information of the corresponding service server in (3) on the right side of FIG. 16. Additionally, also the settings such as the level of a request to be accepted by the belonging group and that of the quality to be maintained by the belonging group are changed to suit the settings of the belonging group. Then, in step S84, it is judged whether or not all of changes have been completed. If all of the changes have not been completed, the process goes back to step S81 and the change process is repeated. If all of the changes have been completed, the process is terminated.

Next, details of step S72 shown in FIG. 15 are described.

When a schedule is generated, the numbers of service servers are basically determined for the respective levels according to a ratio of summed requests.

Suppose that there are 7 service servers in all, including 2 intermediate servers. Also suppose that the average numbers of high-level and low-level requests on a day of the week are respectively 200 and 100 as a result of summing up a log.

Since the ratio of high-level to low-level requests is 2:1, the numbers of service servers are determined by dividing the 5 service servers excluding the intermediate servers at a ratio of 2 to 1. Accordingly, in this case, the numbers of service servers for the respective levels are determined as follows.

high level: 5×(⅔)=3.333→3 servers low level: 5×(⅓)=1.666→2 servers

Next, the existence of intermediate servers is considered. Since the intermediate servers normally execute a low-level request, too many servers are assigned to the low level unless the intermediate servers are considered.

In the above provided example, 3 and 2 service servers are respectively assigned to the high level and the low level. However, the number of intermediate servers is 2. Therefore, the number of servers that always execute a high-level request is only 3, whereas the number of service servers that execute a low-level request is 4 as a result of totaling the low-level servers and the intermediate servers. Accordingly, the intermediate servers must be considered to be included in the low level.

By way of example, the ratio of the numbers of high-level to low-level requests is 2:1 in the above described example. Therefore, the 7 service servers including the intermediate servers are divided at the ratio of 2 to 1. The numbers of service servers for the respective levels are therefore determined as follows.

high level: 7×(⅔)=4.66→5 servers low level: 7×(⅓)=2.33→2 servers

The two intermediate servers are considered to be included in the low level. Therefore, the number of servers to be assigned to the low level, from which the number of the intermediate servers is excluded, results in

2−2=0

However, inconvenience is caused unless at least one service server exists on each of the levels (for example, if the levels of all of intermediate servers are raised, a server processing a low-level request no longer exists). Accordingly, the server configuration becomes as follows.

the number of high-level servers: 4 the number of low-level servers: 1 the number of intermediate servers: 2

The above provided example refers to the case where only the ratio of the number of requests is considered. However, if the weight (load value) of a process differs depending on each service, it must be considered.

Suppose that there are services X and Y, and their load values are respectively 5 and 10.

Also suppose that the breakdown of respective service requests is as follows.

high level: the total number of requests=200 (service X=100, service Y=100)

low level: the total number of requests=100 (service X=20, service Y=80)

In this case, the ratio of high-level to low-level requests is 2:1. The totals of their load values are:

high level: 100×5+100×10=1500 low level: 20×5+80×10=900

Accordingly, the ratio of high-level to low-level load values results in 5:3.

The amount of load on a service server is accurately represented not by the number of requests but by the total of load values. Therefore, it is desirable to use the total ratio of load values also when the numbers of service servers are set.

Accordingly, if the numbers of service servers are recalculated with the total ratio of load values, the total ratio of high-level to low-level load values results in 5:3.

If the seven service servers are divided at this ratio, high level: 7×(5/8)=4.37→4 servers low level: 7×(3/8)=2.62→3 servers If the number of intermediate servers is excluded from the number of low-level servers, the following numbers are determined.

high level: 4 servers low level: 1 server intermediate: 2 servers

Described above is the fundamental schedule setting method. However, because there are other matters for which a difference of server performance, etc. must be considered, it is necessary to make more precise calculations when servers are actually operated. However, there is no difference in the basic method assigning the numbers of servers based on a request ratio as described above.

Furthermore, it is also possible to consider the priorities of schedule settings. That is, "Priority" is referenced when a service server configuration schedule is generated. For instance, if the top priority (Priority1) and the second priority (Priority2) are respectively a day of the week and a date, a schedule is generated for each day of the week, and the server configuration is set separately for a date on which an imbalance is significant.

Furthermore, a schedule is stored by a server information storing unit within a service managing server, and referenced when a server configuration is automatically changed.

Figure 17:
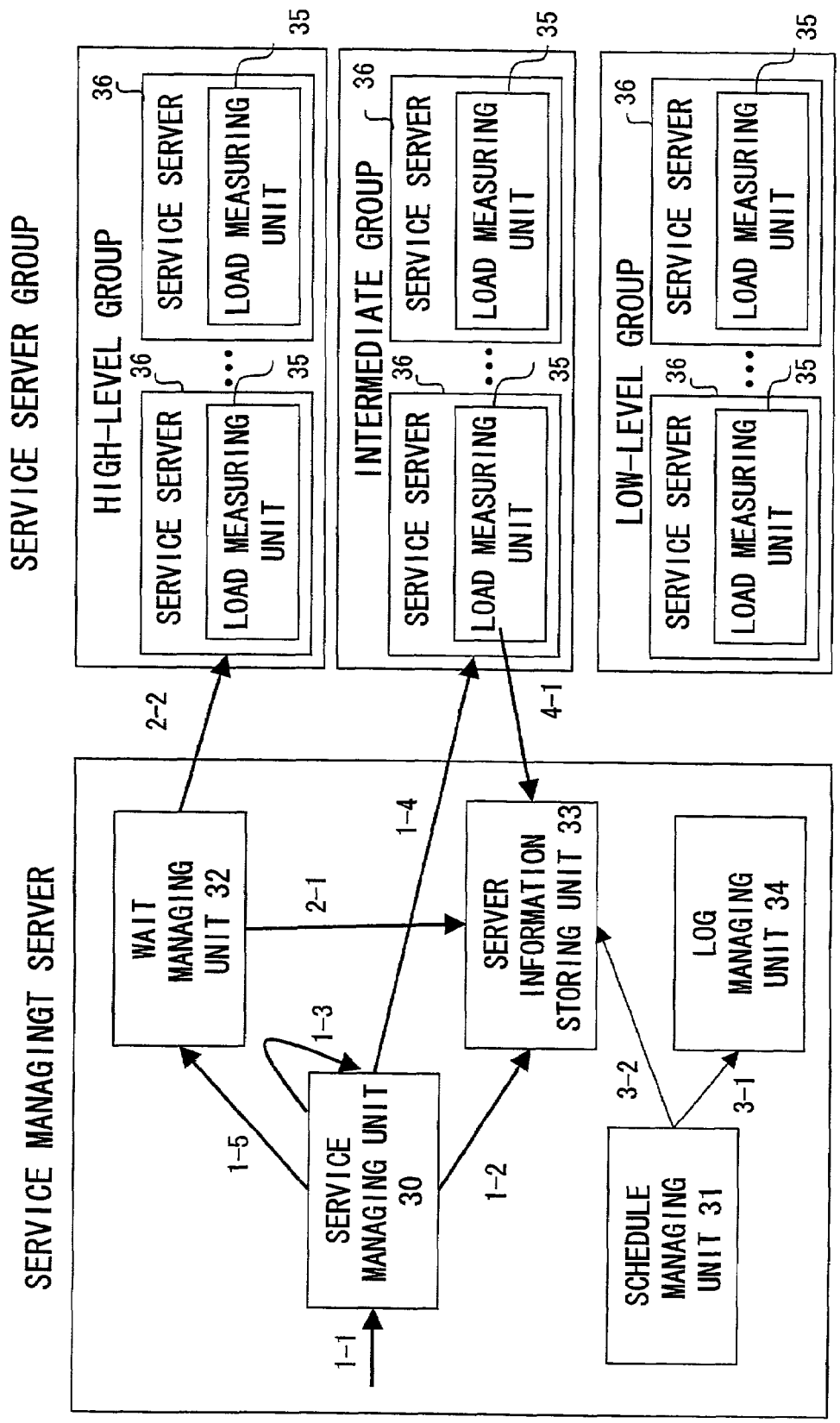
FIG. 17 is a block diagram showing a system according to the preferred embodiment of the present invention.

FIG. 17 is a block diagram showing a system according to the preferred embodiment of the present invention.

A service managing server comprises a service managing unit 30, a schedule managing unit 31, a wait managing unit 32, a sever information storing unit 33, and a log managing unit 34.

Furthermore, each service server 36 within a service server group comprises a load measuring unit 35.

The service managing unit 30 determines a distribution target upon receipt of a request, and raises/drops the level of a service server. The server information storing unit 33 manages the information of the entire system, and stores the entire data managed by the service managing server. The wait managing server 32 stores a request that cannot be distributed when service servers are busy, and transmits the request to a service server when the load on the service server decreases. The schedule managing unit 31 sets and manages a service server configuration schedule. The log managing unit 34 stores a request log. The load measuring unit 35 within each service server monitors the load state of its own service server, and periodically transmits a monitoring result to the server information storing unit 33. The load measuring unit 35 also stores data managed by each service sever.

When a process for transmitting a received request to a service server is performed, a request including SLA information is received as shown in 1-1. Then, server information is obtained from the server information storing unit 33 as shown in 1-2, and a distribution target of the request is determined in 1-3. If the request can be executed, the request is transmitted to the service server 36 the load of which is the lightest as shown in 1-4. If the request cannot be executed (the SLA cannot be maintained), the request is transmitted to the wait managing unit 32 as shown in 1-5.

When a process for transmitting a waiting request is performed, server information is obtained from the server information storing unit 33 at predetermined time intervals in 2-1. When execution of the request becomes possible, this request is transmitted to a service server 36.

When a process for setting a schedule is performed, a request log is obtained from the log managing unit 34 in 3-1. Then, a schedule is set in 3-2, and server information is updated.

When the process for measuring and notifying the load on the service server 36 is performed, the load value on the service server 36 is calculated and periodically notified to the server information storing unit 33.

FIG. 18 shows the data possessed by the respective units shown in FIG. 17.

The server information storing unit 33 possesses a server identification ID, threshold values, a belonging group, a request level to be processed, a quality level to be maintained, load values of services, a server performance evaluation value, a server configuration change time, priorities of summed requests, and a server configuration schedule.

The log managing unit 34 possesses data such as a request time, a service level, a requested service, etc.

The load measuring unit 35 within the service server 36 possesses contents of a process being executed and the data of the local server among the data possessed by the server information storing unit 33.

Figure 19:
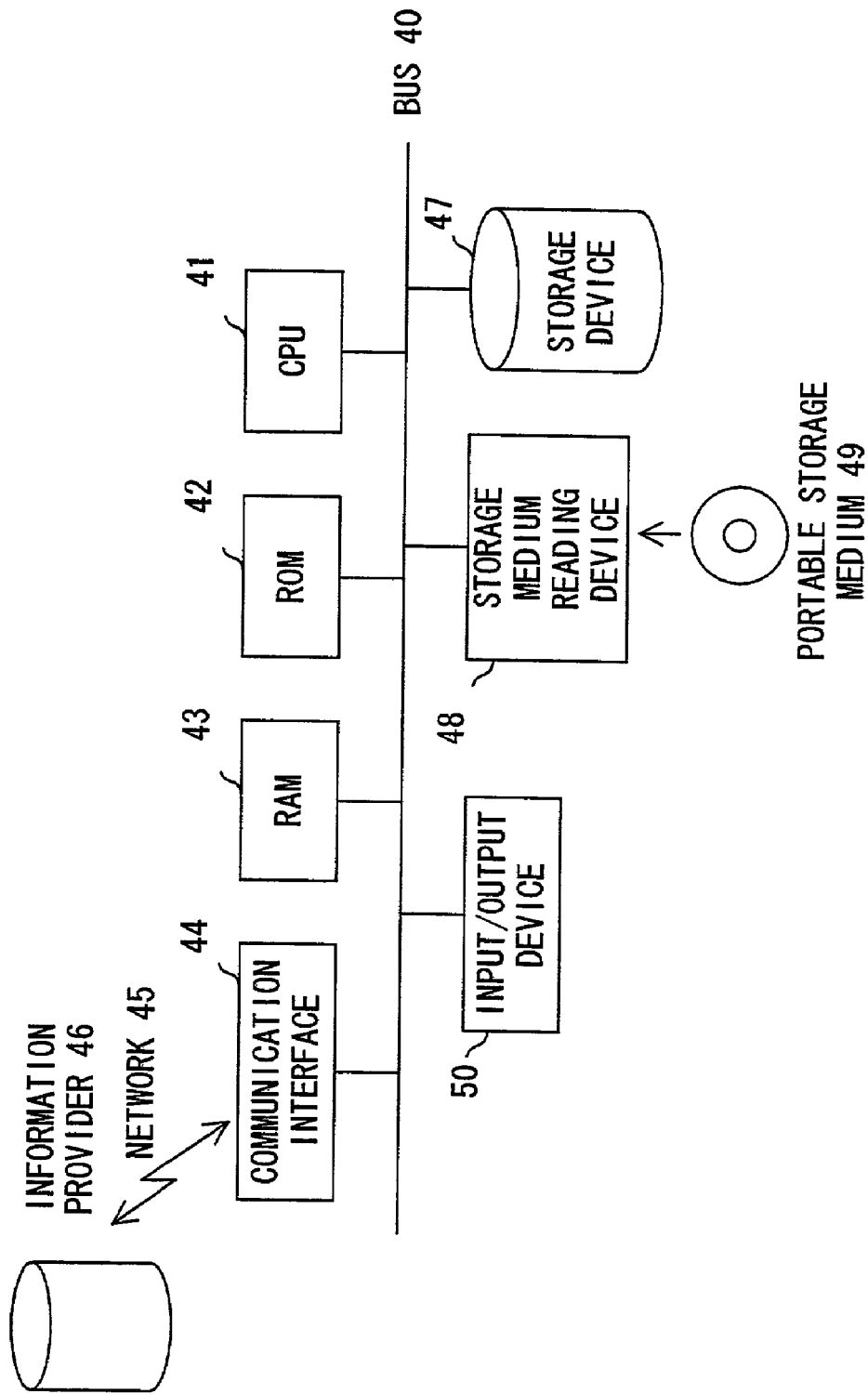
FIG. 19 explains the hardware environment of an apparatus, which is required when the capabilities of a service managing server or a service server according to the preferred embodiment of the present invention are implemented with a program.

FIG. 19 explains the hardware environment of an apparatus, which is required when the capabilities of the service managing server or the service server according to the preferred embodiment of the present invention are implemented by a program.

A CPU 41 reads the corresponding program from a portable storage medium 49 via a storage medium reading device 48 or a storage device 47, which are connected by a bus 40. The CPU 41 then copies the program to a RAM 43 also connected via the bus 40, and executes the program. To a ROM 42 connected to the CPU 41 via the bus 40, basic programs such as a BIOS, etc. are stored. However, a program implementing the preferred embodiment of the present invention may be stored in the ROM 42.

An input/output device 50 is connected to the CPU 41 via the bus 40. The input/output device 50 is used to present an operation result of the CPU 41 to an apparatus user or to notify the CPU 41 of a user instruction, and is configured, for example, by a keyboard, a mouse, a tablet, a display, etc.

A communications interface 44 is used so that the apparatus shown in FIG. 19 communicates with an information provider 46 via a network 45. The program implementing the preferred embodiment of the present invention may be downloaded from the information provider 46, and the CPU 41 may execute the downloaded program. Or, the program may be executed under the network environment. Furthermore, a communication between the service managing server and the service server, or a communication with a Web server may be made via the communications interface 44.

According to the present invention, a service managing apparatus providing a service the quality of which is maintained while suitably making a load difference among service servers rendering services even can be provided.

What is claimed is:

1. A computer readable storage medium encoded with a computer program causing, when executed by the computer, the computer to perform a service managing method accommodating a plurality of service servers each rendering a service via a network in response to a service request from a client, and distributing the service request to the plurality of service servers, said method comprising:

managing the plurality of service servers by dividing the service servers to define a plurality of groups of service servers depending on quality levels of rendered services, and an intermediate server group of service servers which offer low level service among the service servers at normal time and dynamically shift service servers among the plurality of groups and render a service as a service quality of a group to which the shift is made; and reducing a load on a service server within any of the plurality of groups by using at least one service server with the lightest load within the intermediate server group as the service server within any of the plurality of groups, when the load on the service server within any of the plurality of groups increases, and a quality level to be rendered by any of the plurality of groups cannot be maintained, and the service server of the intermediate server group returns to a low level when the load on the service server within any of the plurality of groups decreases after the increase of the load, wherein the service request with a high service level requirement is preferentially processed while still processing service requests of a low service level requirement.

2. The computer readable medium according to claim 1, wherein the plurality of service servers that are grouped comprise a storing unit storing information to which group each of the plurality of service servers belongs.

3. The computer readable medium according to claim 1, wherein a service quality is a response time of the service servers.

4. The computer readable medium according to claim 1, said method further comprising:

recording and managing a log of service requests; and generating a schedule for each date or each day of the week based on the log recorded in the log managing step, and changing a way of dividing the service servers into groups according to a generated schedule.

5. The computer readable medium according to claim 1, wherein:

each of the plurality of service servers executes a load measuring step measuring a load value that a local server requires to process a service request; and a service server within the intermediate server group is shifted to a different group based on a load value of each service server, which is notified from the load measuring step.

6. A service managing method accommodating a plurality of service servers each rendering a service via a network in response to a service request from a client, and distributing the service request to the plurality of service servers, comprising:

managing the plurality of service servers by dividing the service servers to define a plurality of groups of service servers depending on quality levels of rendered services, and an intermediate server group of service servers which offer low level service among the service servers at normal time and dynamically shift service servers among the plurality of groups and render a service as a service quality of a group to which the shift is made; and reducing a load on a service server within any of the plurality of groups by using at least one service server within the intermediate server group as the service server within any of the plurality of groups, when the load on the service server within any of the plurality of groups increases, and a quality level to be rendered by any of the plurality of groups cannot be maintained, and the service server of the intermediate server group returns to a low level when the load on the service server within any of the plurality of groups decreases after the increase of the load, wherein the service request with a high service level requirement is preferentially processed while still processing service requests of a low service level requirement.

7. A computer readable storage medium encoded with a computer program, when executed by the computer causing the computer to perform a service managing method accommodating a plurality of service servers each rendering a service via a network in response to a service request from a client, and distributing the service request to the plurality of service servers, said method comprising:

managing the plurality of service servers by dividing the service servers to define a plurality of groups of service servers depending on quality levels of rendered services, and an intermediate server group of service servers which offer low level service among the service servers at normal time and dynamically shift service servers among the plurality of groups and render a service as a service quality of a group to which the shift is made; and reducing a load on a service server within any of the plurality of groups by using at least one service server within the intermediate server group as the service server within any of the plurality of groups, when the load on the service server within any of the plurality of groups increases, and a quality level to be rendered by any of the plurality of groups cannot be maintained, and the service server of the intermediate server group returns to a low level when the load on the service server within any of the plurality of groups decreases after the increase of the load, wherein the service request with a high service level requirement is preferentially processed while still processing service requests of a low service level requirement.

8. A storage medium encoded with a computer program with a program readable by an information processing device, when executed by the information processing device causing the information processing device to perform a service managing method accommodating a plurality of service servers each rendering a service via a network in response to a service request from a client, and distributing the service request to the plurality of service servers, said method comprising:

managing the plurality of service servers by dividing the service servers to define a plurality of groups of service servers depending on quality levels of rendered services, and an intermediate server group of service servers which offer low level service among the service servers at normal time and dynamically shift service servers among the plurality of groups and render a service as a service quality of a group to which the shift is made; and reducing a load on a service server within any of the plurality of groups by using at least one service server within the intermediate server group as the service server within any of the plurality of groups, when the load on the service server within any of the plurality of groups increases, and a quality level to be rendered by any of the plurality of groups cannot be maintained, and the service server of the intermediate server group returns to a low level when the load on the service server within any of the plurality of groups decreases after the increase of the load, wherein the service request with a high service level requirement is preferentially processed while still processing service requests of a low service level requirement.

9. A computer readable storage medium storing a program directing a computer to realize a service managing apparatus accommodating a plurality of service servers each rendering a service via a network in response to a service request from a client, and distributing the service request to the plurality of service servers, comprising:

a managing unit managing the plurality of service servers by dividing the service servers to define a plurality of groups of service servers depending on quality levels of rendered services, and an intermediate server group of service servers which offer low level service among the service servers at normal time and dynamically shift service servers among the plurality of groups and render a service as a service quality of a group to which the shift is made; and an intermediate server shifting unit reducing a load on a service server within any of the plurality of groups by using at least one service server with the lightest load within the intermediate server group as the service server within any of the plurality of groups, when the load on the service server within any of the plurality of groups increases, and a quality level to be rendered by any of the plurality of groups cannot be maintained, and the service server of the intermediate server group returns to a low level when the load on the service server within any of the plurality of groups decreases after the increase of the load, wherein the service request with a high service level requirement is preferentially processed while still processing service requests of a low service level requirement.

10. A quality of service computer system providing services over at least one network, comprising:

service servers grouped according to quality levels of the services provided, including a group of intermediate service servers offering low level service at a normal time, wherein a service request with a high service level requirement is preferentially processed while still processing service requests of a low service level requirement and wherein an intermediate group server is assigned to one of the quality level groups when the one of the quality level groups cannot maintain a group service level because of an increased load and is reassigned to the intermediate group for performing low level service when the load decreases.

11. The computer system as claimed in claim 10, further comprising a load shifting unit reducing a load on a selected server within any group of said service servers.

12. The computer system as claimed in claim 11, wherein said load shifting unit reduces the load on the selected server by shifting a portion of the load from the selected server to at least one intermediate server having a lightest load among the intermediate servers.

13. A method of load balancing with preferential processing of service requests made by application clients to application running on networked computers, the method comprising:

dividing the servers into groups of servers based on service level requirements of an application group, a group of mid-level servers alternatively used for lower priority applications and higher level applications as needed; and dynamically transferring a server of the mid-level group with the lowest load to a group of servers with a highest service level requirement requiring additional throughput while maintaining a minimum throughput to a lower priority applications, and returning the service server of the mid-level server group to a low level when the load on the service server within any of the plurality of groups decreases after the increase of the load.

* * * * *